United States Patent
Yano et al.

(10) Patent No.: US 8,436,948 B2
(45) Date of Patent: May 7, 2013

(54) REMOTE CONTROL SYSTEM, TELEVISION SET AND REMOTE CONTROLLER USING MANIPULATION SIGNALS

(75) Inventors: Shigehide Yano, Kyoto (JP); Koichi Saito, Kyoto (JP); Masahide Tanaka, Kyoto (JP); Yasuyuki Hatayama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 764 days.

(21) Appl. No.: 12/515,576

(22) PCT Filed: Mar. 4, 2008

(86) PCT No.: PCT/JP2008/053812
§ 371 (c)(1),
(2), (4) Date: May 20, 2009

(87) PCT Pub. No.: WO2008/108352
PCT Pub. Date: Sep. 12, 2008

(65) Prior Publication Data
US 2010/0014005 A1    Jan. 21, 2010

(30) Foreign Application Priority Data

| Mar. 7, 2007 | (JP) | 2007-057920 |
| Mar. 7, 2007 | (JP) | 2007-057921 |
| Mar. 7, 2007 | (JP) | 2007-057922 |
| Mar. 7, 2007 | (JP) | 2007-057923 |

(51) Int. Cl.
*H04N 5/44* (2006.01)
*H04N 7/14* (2006.01)
*H04N 5/60* (2006.01)
*H04N 5/765* (2006.01)
*G06F 3/00* (2006.01)
*G09B 21/00* (2006.01)
*H04B 1/20* (2006.01)

(52) U.S. Cl.
USPC .......... 348/734; 348/14.05; 348/738; 725/61; 340/4.11; 340/4.13; 340/4.4; 386/234; 715/729

(58) Field of Classification Search .......... 348/734, 348/738, 14.05; 725/52, 57, 61, 68, 85, 100, 725/131, 139, 151; 386/234; 715/727, 728, 715/729, 740; 340/4.11, 4.13, 4.4
See application file for complete search history.

(56) References Cited

U.S. PATENT DOCUMENTS 5,818,800 A * 10/1998 Barker ................ 369/29.02
5,909,432 A *  6/1999 Arends et al. ............. 370/261
(Continued)

FOREIGN PATENT DOCUMENTS

| JP | 7-177376 | 7/1995 |
| JP | 08-294184 | 11/1996 |
| JP | 10-243476 | 9/1998 |

(Continued)

*Primary Examiner* — Hoang-Vu A Nguyen-Ba
(74) *Attorney, Agent, or Firm* — Fish & Richardson P.C.

(57) ABSTRACT

A remote control system of the present invention is provided with a TV apparatus and a remote controller, and performs two-way communication. The remote controller is provided with a microphone and a speaker, and generates and outputs sound source data. Furthermore, by the use of wireless communication modules, the sound source data produced by the remote controller is transmitted to the TV apparatus, and the sound source data is transmitted from the TV apparatus to the remote controller, that is, the sound source data is exchanged, with the result that the sound source data is outputted from the TV apparatus and the remote controller.

25 Claims, 11 Drawing Sheets

U.S. PATENT DOCUMENTS

| | | | | |
|---|---|---|---|---|
| 6,578,162 | B1* | 6/2003 | Yung | 714/708 |
| 7,111,319 | B1* | 9/2006 | Watkins | 725/139 |
| 7,490,286 | B2* | 2/2009 | Commarford et al. | 715/200 |
| 7,931,535 | B2* | 4/2011 | Ikeda et al. | 463/38 |
| 2004/0025067 | A1* | 2/2004 | Gary et al. | 713/300 |
| 2004/0254794 | A1* | 12/2004 | Padula | 704/275 |
| 2005/0177373 | A1* | 8/2005 | Cooper et al. | 704/275 |
| 2005/0212685 | A1* | 9/2005 | Gordon | 340/825.19 |
| 2006/0075429 | A1* | 4/2006 | Istvan et al. | 725/39 |
| 2006/0132595 | A1* | 6/2006 | Kenoyer et al. | 348/14.08 |
| 2007/0040947 | A1* | 2/2007 | Koga | 348/725 |
| 2007/0106945 | A1* | 5/2007 | Kim | 715/740 |
| 2008/0055245 | A1* | 3/2008 | Migliacio et al. | 345/158 |

FOREIGN PATENT DOCUMENTS

| | | |
|---|---|---|
| JP | 2002-112140 | 4/2002 |
| JP | 2002-247670 | 8/2002 |
| JP | 2003-032573 | 1/2003 |
| JP | 2004-254006 | 9/2004 |
| JP | 2005-80022 | 3/2005 |
| JP | 2006-129171 | 5/2006 |

\* cited by examiner

REMOTE CONTROL SYSTEM, TELEVISION SET AND REMOTE CONTROLLER USING MANIPULATION SIGNALS

TECHNICAL FIELD

The present invention relates to a remote control system that employs a remote controller for use in an electronic appliance such as a television set, and also relates to a television set and a remote controller that utilize such a remote control system.

BACKGROUND ART

Nowadays, remote controllers are widely used to allow remote manipulation of audio-visual appliances such as television sets and VCRs, DVD players and audio sets, air conditioners and other electronic appliances. However, as electronic appliances become provided with an increasingly large number of functions, remote controllers become provided with more and more buttons and the like that permit various manipulations; thus unfamiliar users can only use part of such a large number of functions. Under this circumstance, in order to facilitate manipulation of remote controllers of electronic appliances, there have been proposed, for example, remote controllers that provide manipulation instructions in the form of audio (see patent documents 1 and 2).

As such a multifunctional remote controller, there has been proposed, for example, a remote controller, for use with a television set which can display a sub window, that can output the audio of a program displayed in the sub window (see patent document 3).

As such multi-functional remote controllers, there have also been proposed, for example, a remote controller that indicates its location by producing sound and a remote control system provided with a microphone (see patent documents 2 and 4).

Patent document 1: JP-A-H10-243476
Patent document 2: JP-A-2002-247670
Patent document 3: JP-A-2003-032573
Patent document 4: JP-A-H08-294184

DISCLOSURE OF THE INVENTION

Problems to be Solved by the Invention

Disadvantageously, however, in order to provide the above-mentioned audio instructions, it is necessary to store a large amount of sound source data. To reduce the amount of data stored, it is necessary either to lower audio quality or to reduce the contents of the audio instructions. It is possible that a user receiving audio instructions alone fails to understand how to perform the manipulation.

If the audio of a program is outputted from a remote controller as described above, this results in the complicated configuration of the remote controller.

If the above-mentioned multi functionality shortens the life of batteries, such a remote controller is not user-friendly.

If a remote controller is configured to allow input and output of audio as mentioned above, it is inevitable that its configuration becomes complicated and its size is increased. Simply allowing input and output of audio limits the use of the remote controller despite its being configured to allow input and output.

In view of the foregoing, it is an object of the present invention to provide a remote control system, a television set and a remote controller that are more user-friendly. It is another object of the invention to provide a remote control system and a television set of simple configuration that can output the audio of a program. It is yet another object of the invention to provide a remote controller and a television set that can achieve multi functionality and that are more user-friendly.

Means for Solving the Problem

To achieve the above objects, according to one aspect of the present invention, there is provided a remote control system including: a television set that receives a television manipulation signal corresponding to a manipulation display on a television screen and that transmits encoded sound source data related to the manipulation signal; and a remote controller that transmits the manipulation signal to the television set and that decodes the sound source data received from the television set and outputs the decoded sound source data in the form of audio.

In the remote control system configured as described above, the television set may transmit sound source data on the following manipulation to the remote controller by reception of the manipulation signal.

In the remote control system configured as described above, when the following manipulation is not performed within a predetermined period after reception of the manipulation signal, the television set may transmit to the remote controller sound source data for prompting a user to perform the following manipulation.

In the remote control system configured as described above, the remote controller may receive sound source data on the following manipulation from the television set by transmission of the manipulation signal.

In the remote control system configured as described above, when the following manipulation is not performed within a predetermined period after transmission of the manipulation signal, the remote controller may receive, from the television set, sound source data for prompting a user to perform the following manipulation.

In the remote control system configured as described above, the television set may change the manipulation display on the television screen by reception of the manipulation signal.

In the remote control system configured as described above, the television set may move a display on the television screen by reception of the manipulation signal.

In the remote control system configured as described above, the television set can display a main screen and a sub screen on the television screen, and the display moved on the television screen may be the sub screen within the main screen.

In the remote control system configured as described above, the display moved on the television screen may be a pointer indicating a manipulation position within the television screen.

In the remote control system configured as described above, the sound source data transmitted from the television set may be ADPCM-encoded, and the remote controller may have an ADPCM decoder.

In the remote control system configured as described above, the remote controller may have a three-dimensional force sensor for generating the manipulation signal.

In the remote control system configured as described above, the remote controller may have a touch panel sensor for generating the manipulation signal.

In the remote control system configured as described above, the remote controller may receive and decode sound source data that is not based on a manipulation on the remote controller and that is transmitted from the television set and output the decoded sound source data in the form of audio.

In the remote control system configured as described above, the remote controller may receive and decode sound source data stored in the television set by transmission from the remote controller and output the decoded sound source data in the form of audio.

According to another aspect of the present invention, there is provided a television set including: a television screen; a transmit/receive portion; a manipulation control portion controlling the television set based on a display on the television screen and a manipulation signal received by the transmit/receive portion; a sound source data storing portion storing encoded sound source data; and a transmission control portion that selects, from the sound source data storing portion, sound source data related to the manipulation signal and that transmits the sound source data through the transmit/receive portion.

In the television set configured as described above, the transmission control portion may transmit sound source data on the following manipulation requested by the manipulation control portion.

In the television set configured as described above, the sound source data storing portion may store ADPCM-encoded sound source data.

According to another aspect of the present invention, there is provided a remote controller including: a manipulation portion; a transmit/receive portion; a transmission control portion transmitting, through the transmit/receive portion, a manipulation signal based on a manipulation on the manipulation portion; a decoder decoding sound source data received in relation to transmission of the manipulation signal; and an output portion outputting the sound source data decoded by the decoder in the form of audio.

In the remote controller configured as described above, the manipulation portion may have a three-dimensional force sensor for generating the manipulation signal.

In the remote controller configured as described above, the manipulation portion may have a touch panel sensor for generating the manipulation signal.

In the remote controller configured as described above, the decoder may have an ADPCM decoder.

The remote controller configured as described above may further include a vibration generation portion operating when decoding is performed by the decoder to produce audio.

According to another aspect of the present invention, there is provided a remote control system including: a television set transmitting sound source data obtained by encoding audio of a program displayed on a television screen; and a remote controller that decodes the sound source data received from the television set and that outputs the decoded sound source data in the form of audio.

In the remote control system configured as described above, the television set may reduce, when transmitting the sound source data to the remote controller, audio output from the television set itself.

In the remote control system configured as described above, the television set can display a main screen and a sub screen on a television screen, and the television set itself may output audio of a program displayed on one of the main and sub screens and the sound source data of audio of a program displayed on the other of the main and sub screens may be transmitted to the remote controller.

In the remote control system configured as described above, the television set may delay, when transmitting the sound source data to the remote controller, an image output on the television screen in synchronization with audio output from the remote controller.

In the remote control system configured as described above, the sound source data transmitted from the television set may be ADPCM-encoded, and the remote controller may have an ADPCM decoder.

According to another aspect of the present invention, there is provided a television set including: a television screen; a speaker; a control portion outputting a television program through the television screen and the speaker; and a wireless transmission portion transmitting sound source data obtained by encoding audio of the television program. In the television set, when the sound source data obtained by the encoding is transmitted from the wireless transmission portion, no audio is outputted from the speaker so that output of audio obtained by decoding the sound source data is prevented from being displaced in time from output of audio from the speaker.

According to another aspect of the present invention, there is provided a television set including: a television screen; a speaker; a wireless transmission portion; a display control portion displaying a main screen and a sub screen on the television screen; and an audio control portion that outputs audio of a program displayed on one of the main and sub screens and that transmits, from the wireless transmission portion, sound source data obtained by encoding audio of a program displayed on the other of the main and sub screens.

The television set configured as described above may further include image delaying means for delaying, when sound source data is transmitted from the wireless transmission portion, an image output on the television screen such that audio obtained by decoding the sound source data and outputted is synchronized with a corresponding image on the television screen.

The television set configured as described above may include: a television screen; a speaker; a control portion outputting a television program through the television screen and the speaker; a wireless transmission portion transmitting sound source data obtained by encoding audio of the television program; and image delaying means for delaying, when the sound source data obtained by the encoding is transmitted from the wireless transmission portion, an image output on the television screen such that audio obtained by decoding the sound source data is synchronized with an image on the television screen.

In the television set configured as described above, the sound source data transmitted from the television set may be ADPCM-encoded.

According to another aspect of the present invention, there is provided a remote control system including: a television set that can receive a television manipulation signal corresponding to a manipulation display on a television screen, that can transmit encoded sound source data related to the manipulation signal and that can transmit sound source data obtained by encoding audio of a program displayed on the television screen; and a remote controller that transmits the manipulation signal to the television set and that decodes the sound source data received from the television set and outputs the decoded sound source data in the form of audio.

According to another aspect of the present invention, there is provided a remote control system including: a manipulation portion; a transmission portion transmitting a manipulation signal; an output portion outputting sound source data on a manipulation in the form of audio; a power supply portion switching between an activated state and a sleep state; and a control portion preventing, even if the transmission of the manipulation signal is completed, the power supply portion from switching from the activated state to the sleep state until the output of the audio from the output portion is completed.

According to another aspect of the present invention, there is provided a remote controller including: a manipulation portion; a transmission portion transmitting a manipulation signal; an output portion outputting sound source data on a manipulation in the form of audio; a power supply portion switching between an activated state and a sleep state; and a control portion controlling the switching of the power supply portion between the activated state and the sleep state such that the power supply portion switches to a different state according to whether the output portion is operated.

In the remote controller configured as described above, the control portion may include control means performing the switching of the power supply portion from the activated state to the sleep state a predetermined period after the transmission of the transmission portion is completed and control means performing the switching of the power supply portion from the activated state to the sleep state based on completion of the output of the audio from the output portion.

In the remote controller configured as described above, the sound source data may be ADPCM-encoded.

The remote controller configured as described above may further include a reception portion receiving the sound source data.

According to another aspect of the present invention, there is provided a remote controller including: a manipulation portion; a transmission portion transmitting a manipulation signal; an output portion outputting sound source data on a manipulation in the form of audio; and a volume control portion controlling the volume of audio outputted from the output portion.

The remote controller configured as described above may further include a reception portion receiving sound source data for use in volume control.

The remote controller configured as described above may further include a transmission portion transmitting a signal for preventing audio from being outputted externally while the audio is outputted, the volume of which is controlled by the volume control portion.

According to another aspect of the present invention, there is provided a television set including: a television screen; a speaker; a control portion outputting a television program through the television screen and the speaker; a wireless transmission portion transmitting encoded sound source data for testing; and an administration portion preventing audio from being outputted from the speaker when the encoded sound source data is transmitted from the wireless transmission portion.

According to another aspect of the present invention, there is provided a remote controller including: a manipulation portion; a transmission portion transmitting a manipulation signal; a reception portion receiving sound source data that is not based on a manipulation on the manipulation portion; and an output portion outputting the received sound source data in the form of audio. In the remote controller, the remote controller can be bcated by transmission of the sound source data.

In the remote controller configured as described above, sound source data based on a manipulation on the manipulation portion and received by the reception portion may be outputted from the output portion such that information related to the manipulation on the manipulation portion is obtained in the form of audio.

In the remote controller configured as described above, the volume of the output portion can be variably set, and, when the sound source data that is not based on a manipulation on the manipulation portion is received, a maximum volume output is produced irrespective of the setting of the volume.

In the remote controller configured as described above, the volume of the output portion may be set differently for the sound source data that is based on a manipulation on the manipulation portion and the sound source data that is not based on a manipulation on the manipulation portion.

In the remote controller configured as described above, the remote controller can be started up either by a manipulation on the manipulation portion or by the reception of the sound source data by the reception portion.

In the remote controller configured as described above, the sound source data may be ADPCM-encoded.

According to another aspect of the present invention, there is provided a remote controller including: a main body that is manipulated by a manipulation signal and that has a memorizing portion memorizing sound source data; and a remote controller that transmits sound source data of acquired audio to the main body and that receives the transmitted sound source data and then outputs the transmitted sound source data in the form of audio.

According to another aspect of the present invention, there is provided a remote controller including: audio acquisition means; a transmission portion transmitting sound source data of acquired audio; a reception portion receiving the transmitted sound source data; and an output portion outputting the received sound source data in the form of audio.

In the remote controller configured as described above, the sound source data may be ADPCM-encoded.

Advantages of the Invention

According to the present invention, since encoded sound source data is transmitted from a television set to a remote controller, the amount of data transmitted can be reduced. Moreover, audio instructions and manipulation instructions displayed on a television screen help a user understand how to perform manipulations and help simplify the configuration of components for manipulations in the remote controller. Thus, it is possible to reduce the size of a high-performance remote controller.

According to the invention, an image displayed on a television screen is delayed, and this prevents an audio output from a remote controller from being displaced as a result of an encoded signal being transmitted. Thus, the user can view a program without feeling uncomfortable even if audio is outputted from the remote controller.

According to the invention, a high-performance and high-power consuming remote controller can be brought to a sleep state when not in use, and this reduces the frequency with which a battery is replaced. Moreover, even if a time is reached when power needs to be turned off, the power remains on until the audio announcement is completed. Thus, it is possible to make the contents of the audio announcement understood.

According to the invention, since the television set records sound source data, it is unnecessary for the remote controller to record the sound source data. This makes it possible to reduce the size of the remote controller. Thus, the transmission of the sound source data to the remote controller allows the remote controller to receive the sound source data and perform an audio output. This helps simplify the configuration of the remote controller and helps locate it.

LIST OF REFERENCE SYMBOLS

1 TV apparatus
2 Remote Controller
101 Broadcast Reception I/F
102 Tuner
103 Decoder
104 Display Control Portion
105 Display
106 Image Memorizing Portion
107 Frame Memory
108 DAC
109 Amplifier
110 Speaker
111 CPU
112 Memory
113 Audio Encoder
114 Audio Data Memory
115 Wireless Communication Module
116 HDD
201 Manipulation Portion
202 Wireless Communication Module
203 Watchdog
204 CPU
205 Memory
206 Power Supply Portion
207 Audio Decoder
208 DAC
209 Amplifier
210 Speaker
211 Microphone
212 ADC
213 Audio Encoder
214 Audio Data Memory
215 Vibration Unit Best Mode for Carrying Out the Invention A remote control system according to an embodiment of the present invention will be described below with reference to the accompanying drawings. In this embodiment, a remote control system in a television apparatus (hereinafter referred to simply as a "TV apparatus") that receives and reproduces a television broadcast will be described as an example.

<System Configuration>

Figure 1:
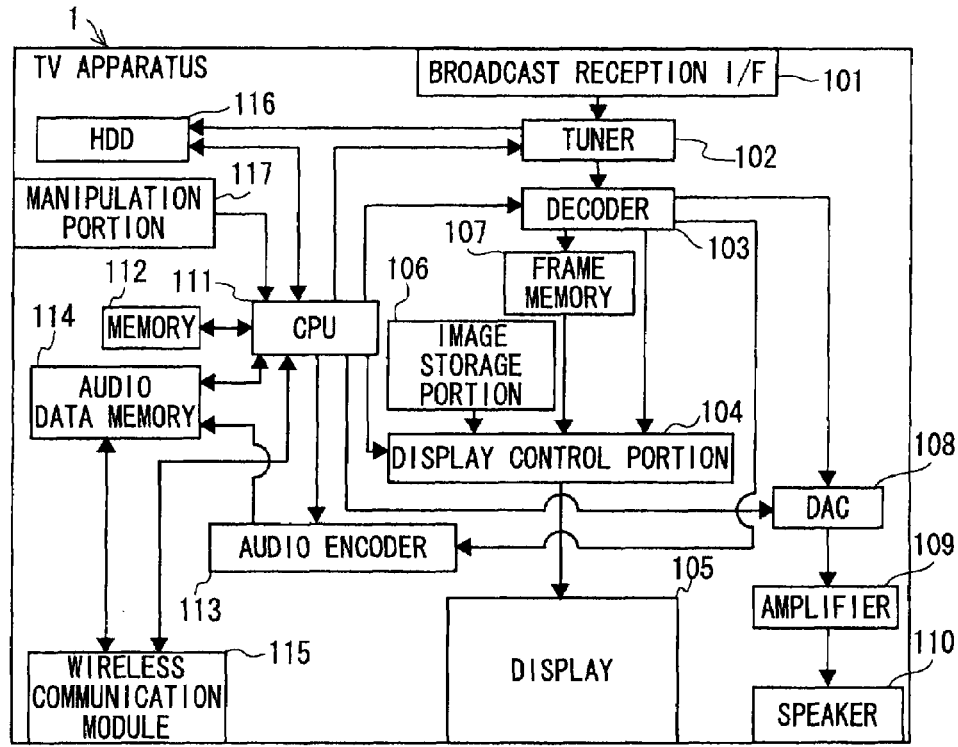
[FIG. 1] is a block diagram showing the internal configuration of individual devices in a remote control system according to an embodiment of the present invention and the relationship therebetween.
Figure 1:
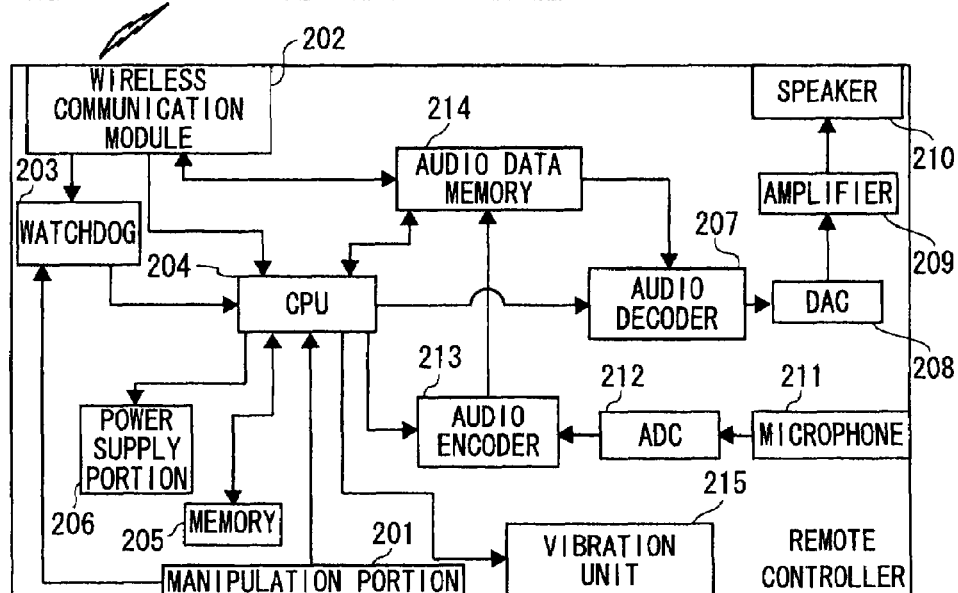

The configuration of the remote control system according to the embodiment of the present invention will now be described with reference to the drawings. FIG. 1 is a block diagram showing the internal configuration of individual devices in the remote control system of this embodiment and the relationship therebetween.

In the remote control system shown in FIG. 1, there are provided a TV apparatus 1 that receives and reproduces a television broadcast such as a terrestrial broadcast or a satellite broadcast and a remote controller 2 that performs wireless communication with the TV apparatus 1 to manipulate it. Between the TV apparatus 1 and the remote controller 2, two-way communication is performed by wireless communication based on, for example, a wireless LAN method conforming to the IEEE802.11 standard including WiFi (trademark) or a Bluetooth (trademark) method.

(TV Apparatus)

The configuration and operation of the TV apparatus 1 in the remote control system configured as described above will be outlined below. As shown in FIG. 1, the TV apparatus 1 is provided with: a broadcast reception interface (I/F) 101 that receives television broadcasts through an antenna, a cable or the like; a tuner 102 that selects from the television broadcasts received through the broadcast reception I/F 101; a decoder 103 that decodes a broadcast signal obtained as a result of a television broadcast being selected by the tuner 102; a display control portion 104 that performs image processing to reproduce and display, on a display 105, a video signal obtained through decoding by the decoder 103; the display 105 that reproduces and displays video; an image memorizing portion 106 that records graphic images and text images (OSD (on-screen display) images) used in, for example, manipulation screens called up by the remote controller 2; a frame memory 107 in which the video signal obtained through decoding by the decoder 103 is temporarily memorized; a DAC (digital-to-analog converter) 108 that converts an audio signal obtained through decoding by the decoder 103 into an analog signal; an amplifier 109 that amplifies the audio signal obtained by the DAC 108; and a speaker 110 that reproduces and outputs audio corresponding to the audio signal amplified by the amplifier 109.

The TV apparatus 1 is further provided with: a CPU 111 that controls the entire apparatus; a memory 112 in which programs for performing individual operations are memorized; an audio encoder 113 that converts the audio signal obtained by the decoder 103 into a highly reproducible digital signal having a reduced amount of data, by an encoding method such as an ADPCM (adaptive differential pulse code modulation) method; an audio data memory 114 in which audio data is memorized that includes sound source data encoded by the same encoding method as used in the audio encoder 113; a wireless communication module 115 that performs wireless communication with the remote controller 2; a HDD (hard disk drive) 116 that records, as a moving picture content file, a broadcast signal obtained as a result of a television broadcast being selected by the tuner 103; and a manipulation portion 117 through which a user manipulates the TV apparatus 1.

In the TV apparatus 1 configured as described above, when a digital television broadcast is received, broadcast signals that are in the form of high-frequency signals (RF signals) and are received through the broadcast reception I/F 101 are fed to the tuner 102. In the tuner 102, the broadcast of a desired channel is selected, is then converted into an intermediate-frequency signal (IF signal) and is then demodulated based on a digital modulation method, with the result that the broadcast signal of the desired channel is acquired. Here, in the case of, for example, a terrestrial digital broadcast employing an OFDM (orthogonal frequency division multiplex) method, in the tuner 102, a plurality of multiplexed carrier signals are first acquired from the IF signal obtained as a result of a broadcast being selected, and then those carrier signals are demodulated by digital modulation methods such as QPSK (quadrature phase shift keying) and QAM (quadrature amplitude modulation), each assigned to those individual carrier signals. In this way, it is possible to obtain a broadcast signal in the form of a digital signal.

When the broadcast signal thus obtained is fed to the decoder 103, in the decoder 103, the broadcast signal is decoded by an encoding method such as an MPEG compression encoding method, and thus a video signal and an audio signal are obtained. Then, when the video signal is fed to the display control portion 104, it is first subjected to image processing such as scaling and is then fed to the display 105, where the video of the received television broadcast is reproduced and outputted. When the audio signal obtained by the decoder 103 is fed to the DAC 108 and is converted into an audio signal in the form of an analog signal, audio corresponding to the audio signal is reproduced and outputted from the speaker 110.

In the TV apparatus 1 reproducing and outputting a television broadcast as described above, the tuner 102 is so configured as to select the television broadcasts of a plurality of channels. Specifically, in order to receive, when a plurality of screens are displayed on the display 105, broadcast signals corresponding to the number of the screens, the tuner 102 is configured to include as many tuner circuits for selecting a plurality of channels as there are channels selected. When a plurality of video signals are obtained as a result of the selected broadcast signals being decoded by the decoder 103, these video signals are combined by the display control portion 104. This results in a plurality of screens being displayed on the display 105.

Thus, in a case where, when video is displayed on the display 105, a main screen is combined with one sub screen, two tuner circuits select broadcast signals to be reproduced in the main and the sub screens, respectively. Then, when the two broadcast signals obtained as a result of the broadcasts being selected are fed to the decoder 103, they are decoded by the decoder 103, and thus video signals corresponding to the main and the sub screens, respectively, are obtained. The video signals based on these two broadcast signals are fed to the display control portion 104, where the video signal for the sub screen is subjected to image processing such as reduction processing and is thereby reduced. Then, the video signal for the sub screen is combined with the video signal for the main screen.

When an OSD display other than such a display of a plurality of screens is requested, the display control portion 104 reads an OSD image memorized in the image memorizing portion 106 and performs image combination to display the OSD image on the display 105. Here, in a case where the OSD image is combined with video corresponding to a video signal from the decoder 103 or the frame memory 107, in the display control portion 104, image processing is performed such as scaling on the OSD image and etching on the image obtained by combining the OSD image with the video. It is possible that only the OSD image memorized in the image memorizing portion 106 is displayed on the display 105.

When recording on the HDD 116 is requested, the broadcast signal obtained by the tuner 102 is fed through the CPU 111 to the HDD 116 and is recorded on the HDD 116. When the method of encoding the moving picture content file to be recorded on the HDD 116 differs from that used by the decoder 103, the video signal and the audio signal obtained through decoding by the decoder 103 are encoded based on the encoding method for recording on the HDD 116, and are then recorded on the HDD 116.

When reproduction from the HDD 116 is requested, the moving picture content file recorded on the HDD 116 is read, and is fed through the CPU 111 to the decoder 103. Then, when the moving picture content file is converted into a video signal and an audio signal by the decoder 103, video and audio corresponding to the video and audio signals are reproduced and outputted from the display 105 and the speaker 110, respectively. When the method of encoding the moving picture content file to be recorded on the HDD 116 differs from that used by the decoder 103, the moving picture content file read from the HDD 116 is decoded based on the encoding method for recording on the HDD 116, and thus video and audio signals are acquired. Thereafter, the acquired video and audio signals are fed to the display control portion 106 and the amplifier 109, and then video and audio are reproduced and outputted from the display 105 and the speaker 110, respectively.

In the wireless communication module 115, a wireless communication signal received from the remote controller 2 is demodulated and decoded based on a wireless communication method. Here, when a wireless communication signal carrying manipulation request data for the TV apparatus 1 is received, the manipulation request data is analyzed by the CPU 111, and, based on the manipulation request data, instructions are fed to relevant blocks; in the case of audio data acquired by the remote controller 2, it is fed to and recorded in the audio data memory 114.

In the wireless communication module 115, various types of data to be fed to the remote controller 2 are encoded and modulated based on the wireless communication method. Here, to the wireless communication module 115 is fed: from the CPU 111, status data indicating the status of the TV apparatus 1 to the remote controller 2; from the audio data memory 114, audio data including recorded sound source data; and from the audio encoder 113, audio data obtained by encoding an audio signal from the decoder 103.

(Remote Controller)

The configuration and operation of the remote controller 2 in the remote control system configured as described above will now be outlined below. As shown in FIG. 1, the remote controller 2 is provided with: a manipulation portion 201 that is manipulated by a user; a wireless communication module 202 that performs wireless communication with the TV apparatus 1; a watchdog 203 that feeds, to a CPU 204, a signal for bringing the remote controller 2 into operation from a sleep state when the manipulation portion 201 is manipulated or when the wireless communication module 202 receives a wireless communication signal from the TV apparatus 1; a CPU 204 that controls the entire units of the remote controller 2; a memory 205 in which programs for performing various operations are memorized; and a power supply portion 206 that supplies electric power to different blocks of the remote controller 2.

The remote controller 2 is further provided with: an audio decoder 207 that decodes audio data including sound source data by an encoding method such as an ADPCM method (the same encoding method as used in the audio encoder 113 in the TV apparatus 1); a DAC 208 that converts an audio signal decoded by the audio decoder 207 into an analog signal; an amplifier 209 amplifying an audio signal that is obtained by the DAC 208 and is in the form of an analog signal; and a speaker 210 that outputs audio based on the audio signal amplified by the amplifier 209.

The remote controller 2 is further provided with: a microphone 211 that converts external sound into an audio signal in the form of an electric signal; an ADC (analog-to-digital converter) 212 that converts the audio signal in the form of an analog signal obtained by the microphone 211 into a digital signal; an audio encoder 213 that encodes the audio signal obtained by the ADC 212 by the same encoding method as used in the audio decoder 207; an audio data memory 214 in which audio data from the audio encoder 213 and audio data received by the wireless communication module 202 are temporarily memorized; and a vibration unit 215 that mechanically vibrates the remote controller 2.

In the remote controller 2 configured as described above, when the wireless communication module 202 receives a wireless communication signal from the TV apparatus 1, it demodulates and decodes it based on the wireless communication method. Here, when status data is obtained from the received wireless communication signal, the status data is fed to the CPU 204, where its contents are analyzed.

When the audio data including sound source data is obtained from the received wireless communication signal, this audio data is temporarily memorized in the audio data memory 214. Then, when the audio data memorized in the audio data memory 214 is read and fed to the audio decoder 207, it is decoded by the same encoding method as used in the audio encoder 113 in the TV apparatus 1, and is then converted into an analog signal by the DAC 208. This audio signal in the form of an analog signal is fed to the amplifier 209, and then audio corresponding to the received audio data is reproduced and outputted from the speaker 210.

The manipulation portion 201 is configured with a unit for manipulating the GUI (graphic user interface) of the OSD image displayed on the display 105 in the TV apparatus 1. Specifically, it is configured with a simply structured unit that allows: position setting manipulation for moving a pointer vector two-dimensionally in the OSD image displayed; and item specifying manipulation for determining an item indicated by the pointer vector. When the manipulation portion 201 is manipulated, the contents of the manipulation are fed to the CPU 204, where manipulation request data is generated. This manipulation request data is fed to the wireless communication module 202, where it is encoded and modulated based on the wireless communication method and is then converted into a wireless communication signal; it is then transmitted to the TV apparatus 1.

The manipulation portion 201 can be simply configured, such as by the use of a three-dimensional (3D) force sensor or a touch panel, to allow the position setting manipulation or the item specifying manipulation described above. When the manipulation portion 201 configured with the 3D force sensor, the touch panel or the like is manipulated two-dimensionally in a direction horizontal to the plane on which the manipulation portion 201 is provided, the position setting manipulation for indicating that direction is achieved; When it is manipulated in a direction vertical to the plane on which the manipulation portion 201 is provided, the item specifying manipulation for determining an item is achieved.

When external sound is inputted through the microphone 211, it is converted into an audio signal in the form of an electric signal by the microphone 211, and the audio signal in the form of an analog signal is then converted into a digital signal by the ADC 212. This audio signal in the form of a digital signal is then fed to the audio encoder 213, where it is encoded by an encoding method such as an ADPCM method, with the result that audio data is obtained.

The audio data obtained through encoding by the audio encoder 213 is fed to and memorized in the audio data memory 214. In a case where the audio data thus memorized in the audio data memory 214 is transmitted to and memorized in the TV apparatus 1, the audio data is read and fed to the wireless communication module 202, where it is encoded and modulated based on the wireless communication method. Thus, it is converted into a wireless communication signal and is then transmitted to the TV apparatus 1.

While the manipulation portion 201 is not manipulated or a wireless communication signal is not received by the wireless communication module 202, in order to reduce electric power supplied from the power supply portion 206 to achieve lower power consumption, the remote controller 2 is kept in a sleep state in which electric power from the power supply portion 206 is supplied only to the wireless communication module 202, the watchdog 203 and part of the CPU 204. In this sleep state, the watchdog 203 checks whether a manipulation is performed on the manipulation portion 201 and whether reception is performed by the wireless communication module 202, every predetermined period T0. When the watchdog 203 finds either that a manipulation is performed on the manipulation portion 201 or that a wireless communication signal is received by the wireless communication module 202, the watchdog 203 notifies the CPU 204 of it to exit the sleep state. Here, electric power is also supplied to blocks that have not received electric power from the power supply portion 206, and thus the remote controller 2 is brought into an ON state.

The vibration unit 215 vibrates the remote controller 2 according to audio reproduced and outputted from the speaker 210. This vibration may be varied in combination of vibration cycles, vibration duration or the like according to the audio reproduced and outputted.

(Various Types of Operation Processing by Remote Controller)

The various types of operation processing by the remote controller 2 in the remote control system where the TV apparatus 1 and the remote controller 2 are configured as described above will be described in detail below.

(1) Basic Operation

Figure 2:
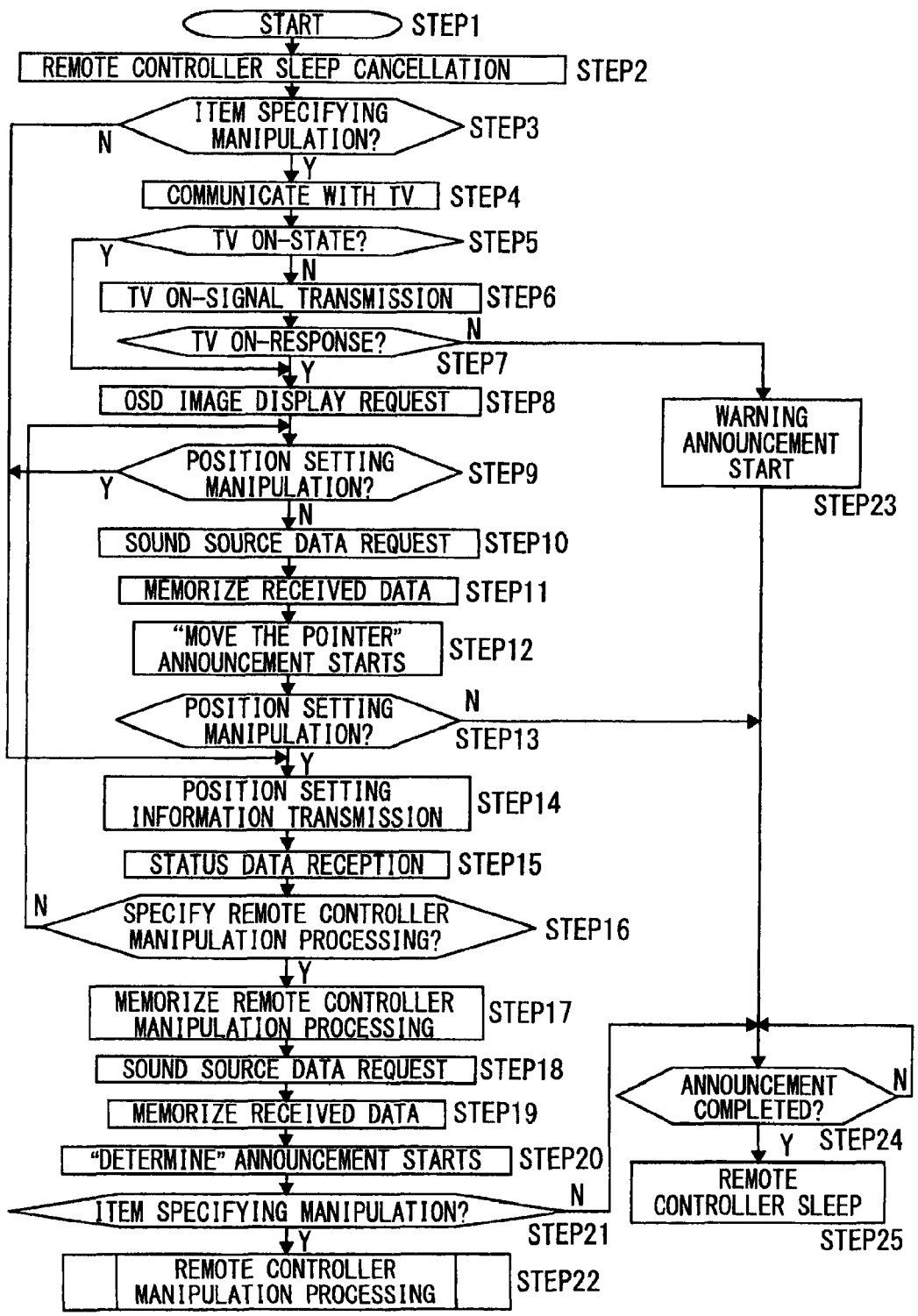
[FIG. 2] is a flow chart showing the basic operation of the remote controller in the remote control system of FIG. 1.

The operation of the remote controller 2 when the manipulation portion 201 is manipulated to bring the remote controller 2 into operation from the sleep state will first be described with reference to a flow chart shown in FIG. 2. FIG. 2 is a flow chart showing the basic operation of the remote controller 2. As described previously, when the watchdog 203 detects a signal from the manipulation portion 201 to find that the manipulation portion 201 has been manipulated, the basic operation induced by the manipulation on the manipulation portion 201 starts (STEP 1).

When the manipulation on the manipulation portion 201 is detected, the watchdog 203 notifies the CPU 204 of it and the sleep state is exited by the CPU 204. Thus, the power supply portion 206 is so controlled as to supply electric power to the entire CPU 204. (STEP 2). The supply of power from the power supply portion 206 is so controlled by the CPU 204 that it supplies electric power to a block that is involved in each operation, the description of which will be omitted below.

Then, the CPU 204 checks whether or not the signal from the manipulation portion 201 corresponds to an item specifying manipulation (STEP 3). In a case where the manipulation portion 201 is formed with the 3D force sensor, such an item specifying manipulation is performed in a direction vertical to the plane on which the 3D force sensor is provided as the manipulation portion 201. The item specifying manipulation includes the function of, when the power to the TV apparatus 1 is off, turning on the power to the TV apparatus 1.

If the signal from the manipulation portion 201 shows that the item specifying manipulation has been performed ("Yes" in STEP 3), manipulation request data for checking whether or not the power to the TV apparatus 1 is on is generated by the CPU 204, and is transmitted from the wireless communication module 202 (STEP 4). Then, whether or not the power to the TV apparatus 1 is on is checked according to whether or not a response signal in the form of a wireless communication signal from the TV apparatus 1 is received by the wireless communication module 202 within a predetermined period T1 (STEP 5).

If the wireless communication module 202 does not receive the wireless communication signal transmitted from the TV apparatus 1 within the predetermined period T1 ("No" in STEP 5), manipulation request data for requesting the turning on of the power to the TV apparatus 1 is generated by the CPU 204 and is transmitted in the form of a wireless communication signal from the wireless communication module 202 to the TV apparatus 1 (STEP 6). The operation in STEP 6 may be performed, not only if the wireless communication module 202 receives the wireless communication signal, but also if status data carried by the received wireless communication signal does not show that the power to the TV apparatus 1 is on.

Thereafter, the wireless communication signal from the TV apparatus 1 is received within a predetermined period T2, and the CPU 204 checks whether or not the wireless communication signal is one carrying status data indicating that the power has been on (STEP 7). Here, if the CPU 204 finds that the status data carried by the received wireless communication signal shows that the power to the TV apparatus 1 has been turned on ("Yes" in STEP 7), the CPU 204 receives the wireless communication signal transmitted from the TV apparatus 1 through the wireless communication module 202, and generates manipulation request data requesting the display of an OSD image (STEP 8).

Figure 3:
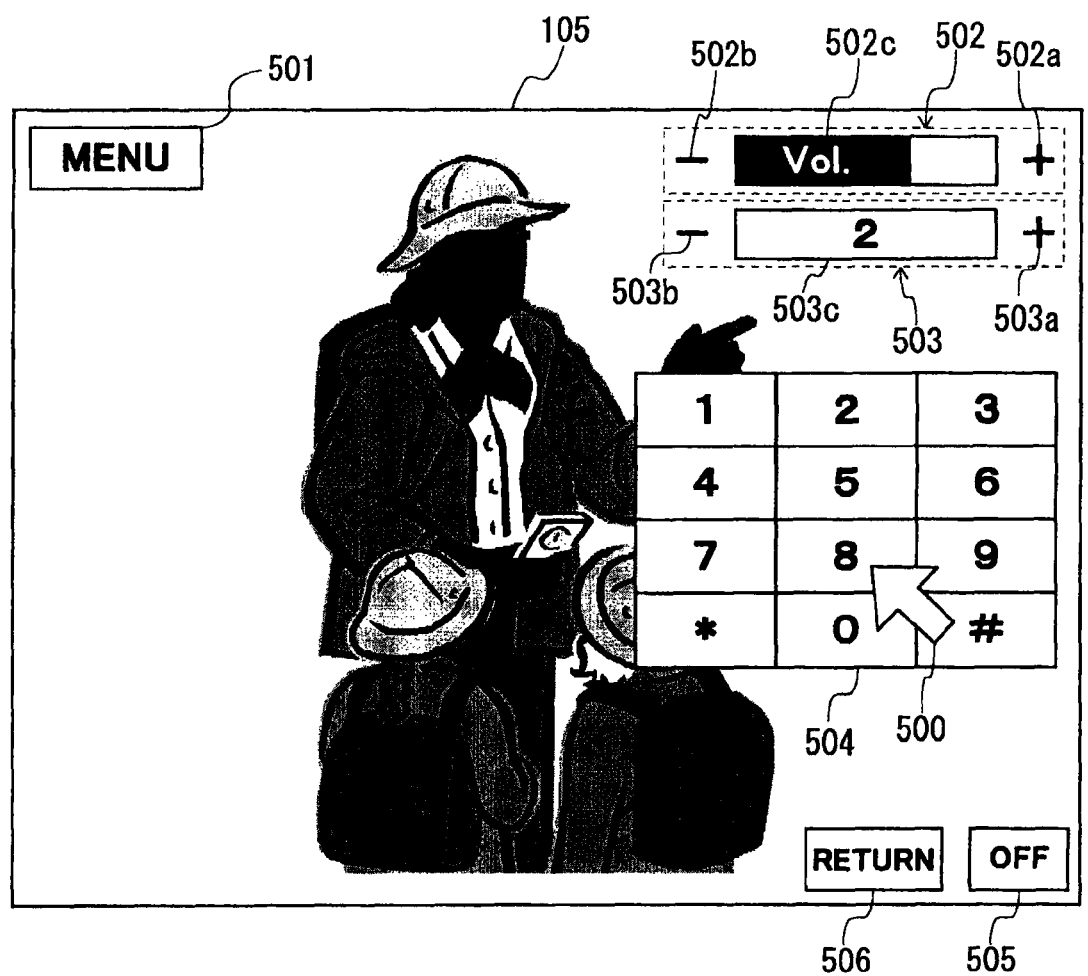
[FIG. 3] is a diagram showing an example of an image display on the display of the TV apparatus in the remote control system of FIG. 1.

Then, the wireless communication signal of this manipulation request data is transmitted to the TV apparatus 1 from the wireless communication module 202. Also, if the status data carried by the wireless communication signal shows that the power has been on ("Yes" in STEP 5), then the process proceeds to STEP 8, where the wireless communication signal of the manipulation request data requesting the display of the OSD image is transmitted to the TV apparatus 1. An example of the OSD image displayed on the display 105 in the TV apparatus 1 is shown in FIG. 3. The display of the OSD image shown in FIG. 3 will be described later.

The period that elapses after the transmission of the wireless communication signal requesting the display of the OSD image is measured by the CPU 204, and whether or not a position setting manipulation is performed on the manipulation portion 201 within a predetermined period T3 is checked by the CPU 204 (STEP 9). Here, if it is found that no manipulation is performed on the manipulation portion 201 ("No" in STEP 9), manipulation request data requesting the transmission of sound source data is generated by the CPU 204, and is transmitted in the form of a wireless communication signal from the wireless communication module 202 (STEP 10). Specifically, in order for the user to be prompted to move the pointer vector on the OSD image displayed on the display 105 in the TV apparatus 1, the TV apparatus 1 is requested to transmit sound source data for the voice "move the pointer."

Thereafter, when it is found that the wireless communication module 202 has received the wireless communication signal of the sound source data from the TV apparatus 1, the received wireless communication signal is demodulated and decoded, and thus the sound source data is obtained and is memorized in the audio data memory 214 (STEP 11). When this sound source data memorized in the audio data memory 214 is read by the audio decoder 207, it is decoded by an encoding method such as an ADPCM method, is converted into an analog signal by the DAC 208, is then amplified by the amplifier 209, and is reproduced and outputted from the speaker 210 (STEP 12). Here, in order to request the user to perform a position setting manipulation, the voice "move the pointer" is reproduced and outputted from the speaker 210.

The period that elapses after the voice "move the pointer" is reproduced and outputted is measured by the CPU 204, and whether or not a position setting manipulation is performed on the manipulation portion 201 within a predetermined period T4 is checked by the CPU 204 (STEP 13). If, in STEP 9 or STEP 13, the position setting manipulation is found to have been performed ("Yes"), manipulation request data indicating the direction specified by the position setting manipulation on the manipulation portion 201 is generated by the CPU 204, and is transmitted in the form of a wireless communication signal from the wireless communication module 202 (STEP 14). Specifically, the movement direction of the pointer vector on the OSD image displayed on the display 105 in the TV apparatus 1 is determined by the position setting manipulation, and manipulation request data indicating the movement direction is generated by the CPU 204. Also if, in STEP 3, the position setting manipulation is performed on the manipulation portion 201 ("No"), the process proceeds to STEP 14.

When, in STEP 14, the wireless communication signal of the manipulation request data indicating the direction specified by the position setting manipulation is transmitted, the wireless communication module 202 receives, from the TV apparatus 1, the wireless communication signal of status data having information on the position indicated by the pointer vector on which the manipulation has been performed (STEP 15). Here, if the position indicated by the pointer vector is within the region for specifying remote controller manipulation processing, a wireless communication signal of status data having information indicating the item of the remote controller manipulation processing in that region is transmitted from the TV apparatus 1. If the position indicated by the pointer vector is not within the region for specifying the remote controller manipulation processing, a wireless communication signal of status data having information indicating that no remote controller manipulation processing is specified is transmitted from the TV apparatus 1.

Then, from the status data obtained from the wireless communication signal received by the wireless communication module 202, the item corresponding to the position indicated by the pointer vector on the OSD image displayed on the display 105 in the TV apparatus 1 is analyzed by the CPU 104 to check whether or not one item of remote controller manipulation processing is being indicated by the pointer vector (STEP 16). Specifically, whether or not on the OSD image displayed on the display 105 in the TV apparatus 1, the position of the pointer vector is within the region for specifying remote controller manipulation processing is checked.

If the status data of the received wireless communication signal indicates one item of the remote controller manipulation processing ("Yes" in STEP 16), the remote controller manipulation processing indicated by the status data is temporarily memorized in the memory 205 (STEP 17). By contrast, if the status data of the received wireless communication signal shows that no item of remote controller manipulation processing is indicated ("No" in STEP 16), the process proceeds to STEP 9, where whether or not the following position setting manipulation has been performed on the manipulation portion 201 is checked within the predetermined period T3 after the previous position setting manipulation is found.

Then, after the memorizing operation is performed in STEP 17, as in STEPs 10 through 12, a wireless communication signal of manipulation request data requesting the transmission of sound source data is transmitted (STEP 18), then the sound source data from the received wireless communication signal is memorized in the audio data memory 214 (STEP 19), and this audio data is decoded by the audio decoder 207, with the result that audio is reproduced and outputted from the speaker 210 (STEP 20). At this point, in order for the user to be prompted to determine the item of processing indicated by the pointer vector on the OSD image displayed on the display 105 in the TV apparatus 1, sound source data for the voice "determine" is requested from the TV apparatus 1 and received, and is reproduced and outputted from the speaker 210.

Then, the period that elapses after the voice "determine" is reproduced and outputted is measured by the CPU 204, and whether or not an item specifying manipulation has been performed on the manipulation portion 201 within a predetermined period T5 is checked by the CPU 204 (STEP 21). The processing operation corresponding to the remote controller manipulation processing memorized in the memory 205 is performed (STEP 22). The remote controller manipulation processing operation in STEP 21 will be described later.

If, in STEP 7, it is found that the wireless communication signal indicating the turning on of the power to the TV apparatus 1 has not been received within the predetermined period T2 ("No"), sound source data for an warning announcement memorized in the audio data memory 214 is read, and is reproduced and outputted from the speaker 210 (STEP 23). Specifically, sound source data for the voice "the power is not on" or "communication is impossible" is read from the audio data memory 214, is decoded by the audio decoder 207, and is converted into an analog signal by the DAC 208. Then, an audio signal carrying the voice for the warning announcement is amplified by the amplifier 209, and is reproduced and outputted from the speaker 210.

When the voice for the warning announcement is reproduced and outputted from the speaker 210 in this way, the CPU 204 checks whether or not the audio announcement reproduced and outputted from the speaker 210 has been completed (STEP 24). If, in STEP 13 or 21, the requested manipulation has not been performed on the manipulation portion 201 ("No"), the process likewise proceeds to STEP 24, where whether or not the audio announcement reproduced and outputted has been completed is checked.

Then, if, in STEP 24, the CPU 204 finds that the audio announcement being presently reproduced and outputted from the speaker 210 has been completed ("Yes"), the remote controller 2 enters the sleep state (STEP 25). Specifically, the CPU 204 controls the power supply portion 206 so that it supplies electric power only to the wireless communication module 202, the watchdog 203 and part of the CPU 204 and stops the supply of electric power to the other blocks, with the result that the sleep state is entered.

(1-1) Another Example 1 of Basic Operation

In the operation described above, when, in STEPs 3 through 8, the item specifying manipulation is performed on the manipulation portion 201 and the sleep state is exited, whether or not the TV apparatus 1 is on is checked and, if the TV apparatus 1 is on or is turned on, the display of an OSD image is requested. Alternatively, it is possible, irrespective of whether the exit of the sleep state is triggered by a position setting manipulation or an item specifying manipulation on the manipulation portion 201, to check whether or not the TV apparatus 1 is on and to request, if the TV apparatus 1 is on or is turned on, the display of an OSD image.

Here, for example, after the sleep state is exited in STEP 2, the operations in STEPs 4 through 7 are performed to check whether or not the TV apparatus 1 is on and, if the power to the TV apparatus 1 is not on, a wireless communication signal requesting the power to be turned on is transmitted. Then, after the display of an OSD image is requested in STEP 8, the process may proceed to STEP 3, where whether the manipulation performed on the manipulation portion 201 is an item specifying manipulation or a position setting manipulation is checked.

(1-2) Another Example 2 of Basic Operation

If the same operations as those described above in STEPs 3 through 8 are performed and, in STEP 3, the manipulation performed on the manipulation portion 201 is found to be a position setting manipulation ("No"), the same operations as those described above in STEPs 4 and 5 may be performed to check whether or not the power to the TV apparatus 1 is on. Here, if the power to the TV apparatus 1 is found to be on, the process proceeds to STEP 14, where the wireless communication signal of the manipulation request data indicating the position setting manipulation is transmitted. By contrast, if the power to the TV apparatus 1 is found not to be on, the process proceeds to STEP 21, where the warning announcement indicating that the power to the TV apparatus 1 is not on is reproduced and outputted from the speaker 210.

(1-3) Another Example 3 of Basic Operation

If, in STEP 3, the manipulation performed on the manipulation portion 201 is found to be a position setting manipulation, and then the power to the TV apparatus 1 is found to be on, a wireless communication signal for requesting the TV apparatus 1 to find whether or not the OSD image is displayed may be transmitted. If the OSD image is found to be displayed, as in STEP 8, the wireless communication signal for requesting the display of the OSD image is transmitted, and then the process proceeds to STEP 14. If the OSD image is displayed, the process proceeds directly to STEP 14.

(1-4) Another Example 4 of Basic Operation

After, in STEP 8, the TV apparatus 1 is requested to display the OSD image, whether or not during the processing operations in STEPs 9 through 12, an item specifying manipulation has been performed on the manipulation portion 201 may be checked. Here, if, during the processing operations in STEPs 9 through 12, an item specifying manipulation has been performed on the manipulation portion 201, the process proceeds to STEP 20, where the wireless communication signal of the manipulation request data indicating that the item specifying manipulation has been performed is transmitted. Then the item of processing specified by the pointer vector on the OSD image displayed on the display 105 is found, and the remote controller manipulation processing corresponding to the specified item of processing is performed.

(2) OSD Image Display

The display of the OSD image on the display 105 in the TV apparatus 1 will now be described briefly with reference to a display example shown in FIG. 3. In the TV apparatus 1, when the OSD image is displayed on the display 105, an image signal of the OSD image memorized in the image memorizing portion 106 is combined, by the display control portion 104, with a video signal obtained by the decoder 103 such that the image signal is superimposed on the video signal. As a result, as shown in FIG. 3, the OSD image is so displayed as to be superimposed on the video corresponding to a broadcast signal selected by the tuner 102 or a moving picture content file read from the HDD 116.

Here, in the screen display on the display 105 shown in FIG. 3, the following items are displayed as the OSD image so as to be superimposed on the video of the video signal obtained by the decoder 103: a pointer vector 500 for pointing different regions; a menu button region 501 for displaying a menu for selecting items of remote controller manipulation processing; a volume setting region 502 in which a button for setting the volume of audio reproduced and outputted from the speaker 110 in the TV apparatus 1 and the status of the volume are displayed; a channel setting region 503 in which a button for setting the channel selected by the tuner 102 in the TV apparatus 1 and the selected channel are displayed; a numeric key pad region 504 for entering numbers and symbols; a power off region 505 for turning off the power to the TV apparatus 1; and a screen return region 506 for returning the OSD image to the previous screen or for hiding the OSD image.

When the OSD image is displayed on the display 105 in this way, if a wireless communication signal transmitted from the remote controller 2 shows that a position setting manipulation has been performed, the pointer vector 500 moves, on the screen of the display 105, in the direction (vector quantity) indicated by the position setting manipulation. When the wireless communication signal transmitted from the remote controller 2 shows that an item specifying manipulation has been performed, the manipulation corresponding to the region pointed by the pointer vector 500 is performed.

Here, if the pointer vector 500 is located in the menu button region 501 and an item specifying manipulation is performed on the remote controller 2, a menu is displayed for specifying various setting operations such as of a recorder function by the remote controller 2, a sub screen display function, a recording/reproduction function to the HDD 116 and the volume setting function of the remote controller 2. The image for this menu is also displayed, as the OSD image accompanied by the pointer vector 500, so as to be superimposed on the video from the decoder 103 as in the example of the display shown in FIG. 3.

The volume setting region 502 is composed of: a button region 502*a* in which, when it is specified by the pointer vector 500, the volume is increased in steps of a predetermined amount; a button region 502*b* in which when it is specified by the pointer vector 500, the volume is decreased in steps of a predetermined amount; and a volume bar region 502*c* in which the current status of the volume is displayed and, when a position on it is specified by the pointer vector 500, the volume is set at an appropriate amount.

The channel setting region 503 is composed of: a button region 503*a* in which, when it is specified by the pointer vector 500, the channel is increased in steps of one channel; a button region 503*b* in which when it is specified by the pointer vector 500, the channel is decreased in steps of one channel; and a channel display region 503*c* in which the current channel is displayed. By specifying a number in the numeric keypad region 504 with the pointer vector 500, it is also possible to specify a desired channel number.

For example, when the screen of the OSD image serving as the above-mentioned menu is displayed, if the screen return region 506 is specified by the pointer vector 500, the screen returns to that of the OSD image shown in FIG. 3. When the screen of the OSD image shown in FIG. 3 is displayed, if the screen return region 506 is specified, the OSD image is hidden, and only the video of the video signal obtained by the decoder 103 is reproduced and displayed on the display 105.

The processing performed when the screen return region 506 is specified will hereinafter be called "screen-return processing."

(3) Remote Controller Manipulation Processing Operation

Figure 4:
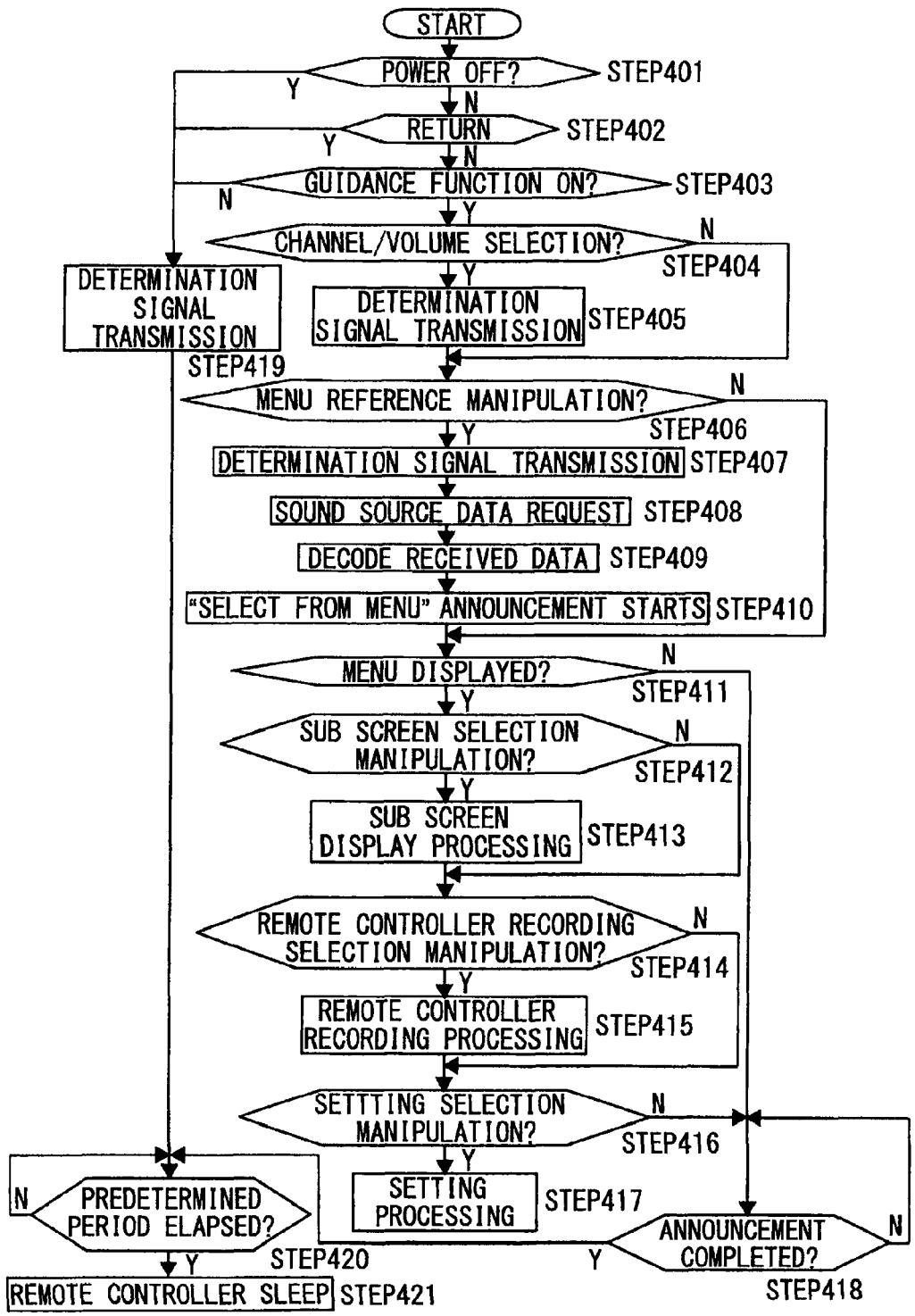
[FIG. 4] is a flow chart showing the remote controller manipulation processing operation in the flow chart of FIG. 2.

The remote controller manipulation processing operation in STEP 22 in the basic operation according to the flow chart of FIG. 2 will now be described with reference to the flow chart of FIG. 4. The CPU 204 first reads, in STEP 17, the contents of the remote controller manipulation processing memorized in the memory 203, and checks whether or not the remote controller manipulation processing is power-off processing for turning off the power to the TV apparatus 1 (STEP 401).

If the remote controller manipulation processing that has been subjected to the check is not the power-off processing ("No" in STEP 401), then the CPU 204 checks whether or not the remote controller manipulation processing read from the memory 203 is screen-return processing for returning the screen on the display 105 to the previous screen STEP 402). Here, if the checked remote controller manipulation processing is not the screen-return processing ("No" in STEP 402), the CPU 204 finds the operation status memorized in the memory 203 to check whether or not an audio guidance function on the remote controller 2 is on (STEP 403).

If the audio guidance function is found to have been turned on ("Yes" in STEP 403), the CPU 204 first checks whether or not the checked remote controller manipulation processing is either channel setting processing or volume setting processing on the TV apparatus 1 (STEP 404). Here, if it is either the channel setting processing or the volume setting processing on the TV apparatus 1 ("Yes" in STEP 404), then the CPU 204 transmits to the TV apparatus 1 a wireless communication signal of manipulation request data indicating that an item specifying manipulation has been performed and determined (STEP 405).

Specifically, the TV apparatus 1 simply performs a setting operation according to the region specified by the pointer vector within the OSD image displayed on the display 105 in the TV apparatus 1, and thus manipulation request data indicating that an item specifying manipulation has been performed and determined is generated by the CPU 204. Then, a wireless communication signal of this manipulation request data is transmitted from the wireless communication module 202 to the TV apparatus 1. Thus, the TV apparatus 1 performs the setting operation corresponding to the region currently being specified by the pointer vector. That is, in the TV apparatus 1, the setting of the channel selected by the tuner 102 or the setting of the volume of the speaker 110 is performed.

Thereafter, if the checked remote controller manipulation processing is found to be neither the channel setting processing nor the volume setting processing on the TV apparatus 1 ("No" in STEP 404) or if the transmission of the wireless communication signal is completed in STEP 405, then whether or not the remote controller manipulation processing checked by the CPU 204 is menu browsing processing for setting various functions such as the above-described recorder function and sub screen display function (STEP 406).

Here, if the checked remote controller manipulation processing is found to be the menu browsing processing ("Yes" in STEP 406), as in STEP 405, a wireless communication signal of manipulation request data indicating that an item specifying manipulation has been performed and determined is transmitted to the TV apparatus 1 (STEP 407). Accordingly, the TV apparatus 1 finds the region (the menu button region 501 in FIG. 3) currently specified by the pointer vector.

Then, a menu is displayed to specify various setting operations such as of the recorder function by the remote controller 2, the sub screen display function, the recording/reproduction function to the HDD 116 and the volume setting function of the remote controller 2.

Thereafter, as in STEPs 10 through 12 in the flow chart of FIG. 2, a wireless communication signal of manipulation request data requesting the transmission of sound source data is transmitted (STEP 408), the sound source data from the received wireless communication signal is memorized in the audio data memory 214 (STEP 409) and this audio data is decoded by the audio decoder 207, with the result that audio is reproduced and outputted from the speaker 210 (STEP 410). Here, in order for the user to be prompted to select from the various setting operations shown in the menu of the OSD image displayed on the display 105 in the TV apparatus 1, sound source data for the voice "select from menu" is requested from the TV apparatus 1 and received, and is reproduced and outputted from the speaker 210.

If the checked remote controller manipulation processing is found not to be the menu browsing processing ("No" in STEP 406) or if the announcement is made in STEP 410, the CPU 204 finds the contents memorized in the CPU 204 to check whether or not the manipulation was performed when the menu of the OSD image was displayed on the display 105 in the TV apparatus 1 (STEP 411). Specifically, when the screen of the OSD image displayed on the display 105 in the TV apparatus 1 was the menu display screen that was displayed by the selection of the menu button region 501 in the display shown in FIG. 3, whether or not the screen of the OSD image displayed on the display 105 in the TV apparatus 1 was determined by the manipulation of the remote controller 2 is checked.

If, in STEP 411, it is found that the manipulation was performed when the menu was displayed by the OSD image on the display 105 and that processing corresponding to one of the functions specified through the menu has been specified ("Yes"), the CPU 204 finds the contents of the memory 205 to check whether or not the sub screen display function is specified (STEP 412). If the sub screen display function is found to have been specified ("Yes" in STEP 412), a sub screen display processing operation, which will be described later, is performed (STEP 413).

If the sub screen display function have not been specified ("No" in STEP 412) or if the sub screen display processing operation has been performed in STEP 413, then whether or not the recorder function by the remote controller 2 has been specified according to the contents memorized in the memory 205 is checked (STEP 414). If the recorder function by the remote controller 2 is found to have been specified ("Yes" in STEP 414), the recorder processing operation, which will be described later, is performed (STEP 415).

If the recorder function by the remote controller 2 has not been specified ("No" in STEP 414) or if the recorder processing operation is performed in STEP 415, then whether or not a function other than those achieved by the processing operations performed in STEPs 413 and 415 has been specified according to the contents memorized in the memory 205 is checked (STEP 416). If it is found that any one of the functions specified when the OSD image in the form of the menu was displayed on the display 105 in the TV apparatus 1 is specified ("Yes" in STEP 416), processing operation corresponding to the function thus found is performed (STEP 417). The processing operation performed in STEP 417 is called a "setting processing operation", which will also be described later.

If the manipulation is found not to have been performed when the menu was displayed by the OSD image on the display 105 ("No" in STEP 411) or if it is found that none of the functions selectable, when the menu was displayed, was selected ("No" in STEP 416), as in STEP 24 in the flow chart of FIG. 2, the CPU 204 checks whether or not the audio announcement reproduced and outputted from the speaker 210 is completed (STEP 418).

If the checked remote controller manipulation processing is the power-off processing or the screen-return processing ("Yes" in STEP 401 or STEP 402) or if the audio guidance function on the remote controller 2 is off ("No" in STEP 403), then the CPU 204 transmits to the TV apparatus 1 a wireless communication signal of manipulation request data indicating that an item specifying manipulation has been performed and determined so that the remote controller manipulation processing found from the memory 203 is performed (STEP 419).

Specifically, when the wireless communication signal is transmitted in STEP 419, if the process shifts from STEP 401, the TV apparatus 1 performs the power-off processing, or if the process shifts from STEP 402, the TV apparatus 1 performs the screen-return processing. If the process shifts from STEP 403, the specified remote controller manipulation processing other than the power-off processing and screen return processing is performed in the TV apparatus 1.

When the CPU 204 finds that the audio announcement reproduced and outputted from the speaker 210 has been completed ("Yes" in STEP 418) or the wireless communication signal is transmitted to the TV apparatus 1 in STEP 419, the CPU 204 checks whether or not a predetermined period T6 has elapsed since the manipulation portion 201 was last manipulated. If, in STEP 420, the CPU 204 finds that the predetermined period T6 has elapsed or finds that the predetermined period T6 elapsed ("Yes"), as in STEP 25 in the flow chart of FIG. 2, the remote controller 2 enters the sleep state (STEP 421).

(4) Sub Screen Display Processing Operation

The sub screen display processing operation in STEP 413 in the remote controller manipulation processing operation according to the flow chart of FIG. 4 will now be described with reference to a flow chart shown in FIG. 5. First, in order to activate the sub screen display function on the TV apparatus 1, a wireless communication signal derived from manipulation request data indicating that an item specifying manipulation has been performed and determined is transmitted to the TV apparatus 1 (STEP 501). Thus, in the TV apparatus 1, the manipulation request data of the wireless communication signal shows that the sub screen display function has been specified, and, as shown in FIG. 6, an image reproduced and outputted on the display 105 is composed of a sub screen 601 and a main screen 600 such that the sub screen 601 is superimposed on the main screen 600.

Thereafter, whether or not the position setting manipulation has been performed on the manipulation portion 201 is checked by the CPU 204 (STEP 502). If the position setting manipulation is found to have been performed ("Yes"), a wireless communication signal of manipulation request data indicating the direction specified by the position setting manipulation on the manipulation portion 201 is transmitted to the TV apparatus 1 (STEP 503). When the TV apparatus 1 receives the wireless communication signal indicating the direction specified by the position setting manipulation on the manipulation portion 201, the sub screen 601 displayed as shown in FIG. 6 is shifted in the direction specified by the remote controller 2.

If no position setting manipulation has been performed ("No" in STEP 502) or the wireless communication signal is transmitted in STEP 503, whether or not an item specifying manipulation has been performed on the manipulation portion 201 is checked by the CPU 204 (STEP 504). Here, if the item specifying manipulation is found to have been performed ("Yes"), whether or not a press-and-hold manipulation in which the manipulation portion 201 is held manipulated for a predetermined period t has been performed (STEP 505) is checked. If no item specifying manipulation has been found ("No" in STEP 504), the process proceeds to STEP 502.

Then, if the CPU 204 finds that the period for which the item specifying manipulation has been performed on the manipulation portion 201 is within the predetermined period t (that the performed manipulation is not the press-and-hold manipulation) ("No" in STEP 505), the CPU 204 increments by one and memorizes in the memory 205 a count k of how many times an item specifying manipulation has been performed (STEP 506). If the CPU 204 checks whether or not the count k of how many times an item specifying manipulation has been performed is one (STEP 507) and finds that the count k is one ("Yes"), manipulation request data requesting the transmission of audio corresponding to the video on the sub screen 601 is generated by the CPU 204, and is transmitted in the form of a wireless communication signal to the TV apparatus 1 (STEP 508). It is assumed that the count k is initialized to zero when the sleep state is entered.

Thereafter, when the wireless communication module 202 receives the wireless communication signal of audio data corresponding to the video reproduced and outputted on the display 105 in the TV apparatus 1, the received audio data is decoded (STEP 509), then an operation of reproducing the recorded audio is started (STEP 510) and the process proceeds to STEP 502. Here, in the TV apparatus 1, an audio signal corresponding to the video on the sub screen 601 is encoded with the audio encoder 113 by an encoding method such as an ADPCM method, is then converted into a wireless communication signal by the wireless communication module 115 and is then transmitted to the remote controller 2. In the remote controller 2, when this wireless communication signal is received by the wireless communication module 202, the audio data is acquired from the wireless communication signal and is temporarily memorized in the audio data memory 214.

Then the audio data memorized in the audio data memory 214 is read, is fed to the audio decoder 207 and is decoded by an encoding method such as an ADPCM method, and is then converted into an audio signal in the form of an analog signal by the DAC 208. Thus, audio based on audio data corresponding to the video on the sub screen 601 that is reproduced and outputted on the display 105 in the TV apparatus 1 is reproduced and outputted from the speaker 210 in the remote controller 2.

If the count k is not one ("No" in STEP 507), whether or not the count k is two is checked by the CPU 204 (STEP 511). If the count k is two ("Yes" in STEP 511), manipulation request data requesting the transmission of audio corresponding to the video on the main screen 600 is generated by the CPU 204, and is transmitted in the form of a wireless communication signal to the TV apparatus 1 (STEP 512). Specifically, the audio output from the speaker 210 in the remote controller 2 is switched from the audio corresponding to the video on the sub screen 601 to the audio corresponding to the video on the main screen 600.

Furthermore, manipulation request data requesting stop of the audio output from the speaker 110 in the TV apparatus 1 (muting of the television audio) is generated by the CPU 204, and is transmitted in the form of a wireless communication signal to the TV apparatus 1 (STEP 513). When the TV apparatus 1 receives this wireless communication signal, the TV apparatus 1 performs a muting function, and thus the audio corresponding to the video on the main screen 600 stops being reproduced and outputted from the speaker 110.

Thereafter, the operations in STEPs 509 and 510 are performed, and thus, in the TV apparatus 1, the audio signal corresponding to the video on the sub screen 601 stops being encoded by the audio encoder 113. Instead, the audio signal corresponding to the video on the main screen 600 is encoded by the audio encoder 113, is then converted into a wireless communication signal by the wireless communication module 115, and is transmitted to the remote controller 2. In the remote controller 2, when this wireless communication signal is received by the wireless communication module 202, audio data is acquired from the wireless communication signal, and is temporarily memorized in the audio data memory 214.

Then the audio data memorized in the audio data memory 214 is read, is fed to the audio decoder 207 and is decoded by an encoding method such as an ADPCM method, and is then converted into an audio signal in the form of an analog signal. Thus, audio based on audio data corresponding to the video on the main screen 600 that is reproduced and outputted on the display 105 in the TV apparatus 1 is reproduced and outputted from the speaker 210 in the remote controller 2.

When the count k is not two ("No" in STEP 511), manipulation request data requesting stop of transmission of audio data is generated by the CPU 204, and is transmitted in the form of a wireless communication signal to the TV apparatus 1 (STEP 514). Furthermore, manipulation request data requesting the cancellation of the function of muting the television audio is generated by the CPU 204, and is transmitted in the form of a wireless communication signal to the TV apparatus 1 (STEP 515). The count k is initialized to zero (STEP 516), and then the process proceeds to STEP 502.

In this way, in the TV apparatus 1, the audio signal corresponding to the video on the main screen 600 stops being encoded by the audio encoder 113, and the wireless communication signal stops being transmitted from the wireless communication module 115. Furthermore, the muting function is canceled, and the audio signal corresponding to the video on the main screen 600 is fed to the amplifier 109, with the result that the audio corresponding to the video on the main screen 600 is reproduced and outputted from the speaker 110.

If the CPU 204 finds that the period for which an item specifying manipulation has been performed on the manipulation portion 201 is longer than the predetermined period t (that the performed manipulation is the press-and-hold manipulation) ("Yes" in STEP 505), manipulation request data requesting the removal of the sub screen 601 is generated by the CPU 204, and is transmitted in the form of a wireless communication signal to the TV apparatus 1 (STEP 517). Thus, in the TV apparatus 1, only a video signal corresponding to the main screen 600 is fed from the decoder 103 to the display control portion 104, with the result that the main screen 600 is only displayed on the display 105. Thereafter, as in STEP 25 in the flow chart of FIG. 2, the remote controller 2 enters the sleep state (STEP 518).

(5) Recorder Processing Operation

The recorder processing operation in STEP 415 in the remote controller manipulation processing operation according to the flow chart of FIG. 4 will now be described with reference to a flow chart shown in FIG. 7. First, in order to activate the recorder function by the remote controller 2 in the TV apparatus 1, a wireless communication signal of manipulation request data indicating that an item specifying manipulation has been performed and determined is transmitted to the TV apparatus 1 (STEP 701). Thereafter, the CPU 204 checks whether or not a manipulation for the reproduction operation of recorded audio has been performed on the manipulation portion 201 in the remote controller 2 (STEP 702).

The manipulation for the reproduction operation in STEP 702 may be determined, for example, by indicating a predetermined direction (a first direction) through a position setting manipulation on the manipulation portion 201. In the case of the manipulation for the reproduction operation being determined by indicating the first direction through the position setting manipulation in the following step, STEP 703, manipulation request data requesting the reproduction operation may be generated by the CPU 204 or simply manipulation request data indicating the first direction of the position setting manipulation may be generated by the CPU 204. The GUI function in the TV apparatus 1 may be utilized such that the position setting manipulation is performed in the OSD image displayed on the display 105 to specify a predetermined region (the first region) and then an item specifying manipulation is performed to determine it.

If the manipulation for the reproduction operation is found to have been performed ("Yes" in STEP 702), manipulation request data that indicates the determination by performing the reproduction operation is generated by the CPU 204, and a wireless communication signal of this manipulation request data is transmitted to the TV apparatus 1 (STEP 703). Thereafter, when the wireless communication module 202 receives a wireless communication signal of audio data recorded in the TV apparatus 1, the received audio data is decoded (STEP 704), and the reproduction operation of the recorded audio is started (STEP 705).

Here, in the TV apparatus 1, the audio data memorized in the audio data memory 114 is read, is then converted into a wireless communication signal by the wireless communication module 115 and is transmitted to the remote controller 2. In the remote controller 2, when this wireless communication signal is received by the wireless communication module 202, the audio data is acquired from the wireless communication signal, and is temporarily memorized in the audio data memory 214.

Thereafter, the audio data memorized in the audio data memory 214 is read, is fed to the audio decoder 207 and is decoded by an encoding method such as an ADPCM method, and is then converted into an audio signal in the form of an analog signal by the DAC 208. Thus, audio based on audio data memorized in the audio data memory 114 in the TV apparatus 1 is reproduced and outputted from the speaker 210 in the remote controller 2.

When the audio recorded in the audio data memory 114 in the TV apparatus 1 is reproduced and outputted in this way, the CPU 204 checks whether or not the reproduction has been completed (STEP 706). Specifically, the reception of the wireless communication signal from the TV apparatus 1 is completed, and the CPU 204 checks that no audio data is buffered in the audio data memory 214. By doing so, it is found that the reproduction of the recorded audio has been completed.

Instead of checking that all the audio data to be reproduced has been reproduced, the reproduction operation may be completed by checking that a manipulation for completing the reproduction operation has been performed on the manipulation portion 201. In this case, for example, a determination may be made by performing a position setting manipulation to indicate the predetermined direction (the first direction) or a determination may be made by indicating another predetermined direction (a second direction). A determination may be made by utilizing the OSD image displayed on the TV apparatus 1.

If no manipulation for the reproduction operation has been performed ("No" in STEP 702), the CPU 204 checks whether or not a manipulation for the operation of recording sound inputted via the microphone 211 in the audio data memory 114 in the TV apparatus 1 has been performed on the manipulation portion 201 in the remote controller 2 (STEP 707). This manipulation for the recording operation may also be determined by indicating a predetermined direction (a third direction) through a position setting manipulation on the manipulation portion 201 or may be determined by performing the position setting manipulation in the OSD image displayed on the display 105 to specify the predetermined region (the second region) and then performing an item specifying manipulation.

If the manipulation for the recording operation is found to have been performed ("Yes" in STEP 707), an audio signal corresponding to sound inputted to the microphone 211 is fed to the ADC 212 and is converted into a digital signal sampled every predetermined period (STEP 708), and is then encoded with the audio encoder 213 by an encoding method such as an ADPCM method (STEP 709). The audio data obtained in this way is fed to the audio data memory 214, and is temporarily memorized in the audio data memory 214 (STEP 710).

Then, whether or not the amount of audio data buffered in the audio data memory 214 has exceeded a predetermined amount is checked by the CPU 204 (STEP 711). If the amount of audio data memorized in the audio data memory 214 has exceeded the predetermined amount ("Yes" in STEP 711), the audio data memorized in the audio data memory 214 is fed to the wireless communication module 202, is then converted into a wireless communication signal and is then transmitted to the TV apparatus 1. Thus, recorded audio data is transferred (STEP 712).

If the amount of audio data memorized in the audio data memory 214 is equal to or less than the predetermined amount ("No" in STEP 711) or the audio data is transferred in STEP 712, whether or not a manipulation for completing the recording operation has been performed on the manipulation portion 201 in the remote controller 2 is checked by the CPU 204 (STEP 713). This manipulation for completing the recording operation may also be performed in the same predetermined direction (the third direction) as when the position setting manipulation is performed on the manipulation portion 201 to specify the recording operation or may be determined in a predetermined direction (a fourth direction) different from when the recording operation is specified. It may be determined by performing a position setting manipulation in the OSD image displayed on the display 105 to specify the predetermined region (the third region) and then performing an item specifying manipulation.

If a manipulation for stopping the recording operation is found to have been performed ("Yes" in STEP 713), the remaining audio data memorized in the audio data memory 214 (audio data whose amount is equal to or less than the predetermined amount) is read, is transmitted in the form of a wireless communication signal from the wireless communication module 202 and is transferred to the TV apparatus 1 (STEP 714). Then, whether or not all the audio data memorized in the audio data memory 214 has been transferred is checked by the CPU 204 (STEP 715). If all the audio data memorized in the audio data memory 214 has been transferred ("Yes" in STEP 715), manipulation request data indicating the completion of the transfer operation of recorded audio data is generated by the CPU 204 and is then transmitted in the form of a wireless communication signal from the wireless communication module 202 to the TV apparatus 1 (STEP 716).

If no manipulation for the recording operation has been performed ("No" in STEP 707), whether or not a predetermined period T7 has elapsed since the wireless communication signal indicating the operation of the recording function was transmitted in STEP 701 (STEP 717) is checked by the CPU 204. If the predetermined period T7 has not elapsed yet ("No" in STEP 717), the process proceeds to STEP 702, where the operations in STEP 702 and the following steps are repeated.

Then, If the reproduction is found to have been completed ("Yes" in STEP 706), if the wireless communication signal indicating the completion of the transfer operation is transmitted in STEP 706 or if the predetermined period T7 is found to have elapsed ("Yes" in STEP 717), as in STEP 25 in the flow chart of FIG. 2, the remote controller 2 enters the sleep state (STEP 718).

(5-1) Another Example of Recorder Function

The above description deals with the case where the start and stop of the reproduction operation and the start and stop of the recording operation are checked by the use of the direction specified by the position setting manipulation on the manipulation portion 201 and by the use of the GUI of the OSD image, respectively. However, when the manipulations are checked by pressing the manipulation portion 201 in the item specifying manipulation if it is kept pressed for a period longer than a predetermined period, that is, it is "pressed-and-held", the recording manipulation may be determined to be performed, and if it is kept pressed for a period shorter than the predetermined period, the reproduction manipulation may be determined to be performed. While the recording manipulation or the reproduction manipulation is being performed, the recording manipulation or the reproduction manipulation currently being performed may be stopped by performing an item specifying manipulation on the manipulation portion 201 again The above description deals with the case where, when the recorder processing operation is performed by the use of the remote controller 2, the audio data inputted via the microphone 211, that is, recording target audio data, is memorized in the audio data memory 114 in the TV apparatus 1. However, when a large-capacity recording medium like the HDD 116 is provided or a removable recording medium is provided in addition to the HDD 116, the recording target audio data may be recorded on the recording medium such as the HDD 116. When the amount of audio data to be memorized is small or it is impossible to communicate with the TV apparatus 1, the recording target audio may be recorded in the audio data memory 214 in the remote controller 2.

(6) Setting Processing Operation

The setting processing operation in STEP 417 in the remote controller manipulation processing operation according to the flow chart of FIG. 4 will be described with reference to a flow chart shown in FIG. 8. First, in order to perform a function selected from the menu displayed in the OSD image in the TV apparatus 1, a wireless communication signal of manipulation request data indicating that an item specifying manipulation has been performed and determined is transmitted to the TV apparatus 1 (STEP 801). Thus, in the TV apparatus 1, the manipulation request data of the wireless communication signal shows selected setting processing operation.

After the transmission of the wireless communication signal, the CPU 204 finds the contents memorized in the memory 205 to check whether or not the setting processing operation determined by the item specifying manipulation is the volume setting operation of the remote controller 2 (STEP 802). If it is found that the volume setting operation of the remote controller 2 has been specified ("Yes" in STEP 802), manipulation request data requesting the transmission of sound source data (test sound source data) that is reproduced and outputted to test the volume of the remote controller 2 is generated by the CPU 204, and is transmitted in the form of a wireless communication signal through the wireless communication module 202 (STEP 803).

Specifically, the TV apparatus 1 is requested to transmit the sound source data serving as the test sound reproduced and outputted from the speaker 210 so that the volume of audio outputted from the speaker 210 in the remote controller 2 is checked. This sound source data serving as the test sound is stored, like the other sound source data described previously, in the audio data memory 114 in the TV apparatus 1. Thus, this test sound source data is read from the audio data memory 114, is converted into a wireless communication signal by the wireless communication module 115 and is transmitted to the remote controller 2 from the TV apparatus 1.

Then, when the wireless communication signal of the test sound source data is received by the wireless communication module 202, the test sound source data obtained from the received wireless communication signal is memorized in the audio data memory 214 (STEP 804). This test sound source data memorized in the audio data memory 214 is read, and is fed to the audio decoder 207, where it is decoded by an encoding method such as an ADPCM (STEP 805).

Thereafter, manipulation request data requesting the speaker 110 in the TV apparatus 1 to stop audio output (to mute the television audio) is generated by the CPU 204, and is transmitted in the form of a wireless communication signal to the TV apparatus 1 (STEP 806). The TV apparatus 1 receives this wireless communication signal and thus performs a muting function to stop the reproduction and output of audio from the speaker 110.

In order for an audio announcement corresponding to the test sound source data to be reproduced and outputted repeatedly until the volume is determined, the audio signal obtained by decoding the test sound source data is temporarily stored in the audio decoder 207 (STEP 807). The audio decoder 207 may be set such that, in order for the audio announcement to be reproduced and outputted repeatedly, the audio decoder 207 reads the test sound source data from the audio data memory 214 to decode it every time the output of the audio announcement is completed.

As described above, the audio decoder 207 is set such that the audio announcement is reproduced and outputted repeatedly, and then the audio signal decoded by the audio decoder 207 is converted into an analog signal by the DAC 208 and the audio announcement corresponding to the test sound source data is reproduced and outputted from the speaker 210 (STEP 808). When the reproduction and output of this audio announcement is started, the volume of the audio announcement reproduced and outputted from the speaker 210 is varied by changing the amplification factor of the amplifier 209 (STEP 809), and then whether or not volume obtained by varying the volume in STEP 809 has been determined as a result of an item specifying manipulation being performed on the manipulation section 201 is checked by the CPU 204.

If the manipulation for determining the volume is not performed on the manipulation section 201 ("No" in STEP 810), the process proceeds to STEP 809, and the volume of the audio announcement reproduced and outputted from the speaker 210 is varied by changing the amplification factor of the amplifier 209. If the manipulation for determining the volume is performed on the manipulation section 201 ("Yes" in STEP 810), the amplification factor of the amplifier 209 is checked and a volume code corresponding to the amplification factor is memorized in the memory 205 (STEP 811). Although the above description discusses the case where the volume is varied according to only the amplification factor of the amplifier 209, the volume may be varied according to the amplification amount of the digital/analog conversion by the DAC 208. In this case, the volume code may also include information on the amplification amount by the DAC 208.

The volume code based on the set volume is memorized in the memory 205, and then the audio signal temporarily stored in the audio decoder 207 is deleted and the test sound source data memorized in the audio data memory 214 is also deleted, with the result that the reproduction and output of the audio announcement from the speaker 210 is stopped (STEP 812). Manipulation request data requesting the cancellation of the function of muting television audio is generated by the CPU 204 and is transmitted in the form of a wireless communication signal to the TV apparatus 1 (STEP 813). In this way, the muting function is cancelled in the TV apparatus 1, and this allows the speaker 110 to reproduce and output audio.

If it is found that a setting processing operation other than the volume setting processing operation of the remote controller 2 has been specified ("No" in STEP 802), the manipulation portion 201 of the remote controller 2 is manipulated, and the specified setting processing operation is performed by the use of wireless communication between the remote controller 2 and the TV apparatus 1 (STEP 814). This setting processing operation in STEP 814 is not particularly limited, and examples of the setting processing operation include processing operations for determining various setting factors for the TV apparatus 1 and the remote controller 2.

Then, whether or not a wireless communication signal carrying both the status data indicating that the setting processing operation is completed in STEP 814 and the sound source data indicating that the processing operation is completed has been received by the wireless communication module 202 is checked by the CPU 204 (STEP 815). If the wireless communication signal indicating that the setting processing operation is completed is found not to have been received ("No" in STEP 815), the process again proceeds to STEP 814, where the specified setting processing operation is performed.

If the wireless communication signal indicating that the setting processing operation is completed is found to have been received ("Yes" in STEP 815), the sound source data derived from the received wireless communication signal is memorized in the audio data memory 214, and then this sound source data is decoded by the audio decoder 207 (STEP 816). The audio signal obtained by the decoding is converted into an analog signal by the DAC 208, and is then amplified by the amplifier 209, with the result that an audio announcement such as the voice "the processing has been completed" is reproduced and outputted from the speaker 210 (STEP 817).

If this audio announcement from the speaker 210 is started, the CPU 204 controls the vibration unit 215 such that the vibration unit 215 starts a vibration operation (STEP 818). If this vibration unit 215 starts vibrating, the CPU 204 checks whether or not the audio announcement currently being reproduced and outputted from the speaker 210 has been completed (STEP 819). Thus, if the CPU 204 finds that the audio announcement currently being reproduced and output-ted from the speaker 210 has been completed ("Yes" in STEP 819), the CPU 204 stops the vibration of the vibration unit 215 (STEP 820).

After, in STEP 813, a wireless communication signal for canceling the function of muting television audio is transmitted to the TV apparatus 1 or after, in STEP 820, the vibration of the vibration unit 215 is stopped, as in STEP 215 in the flow chart of FIG. 2, the remote controller 2 enters the sleep state (STEP 821).

The above description discusses the case where the operations of the remote controller 2 are performed sequentially based on the flow charts of FIGS. 2, 4, 5, 7 and 8. However, these operations based on the flows may be performed in parallel, and, while operations based on one of the flows are performed, an interrupt signal for performing operations based on another flow may be fed to the CPU 204 and the operations based on the flow specified by the interrupt signal may be performed.

(Various Types of Operation Processing by the TV Apparatus)

The various types of operation processing by the TV apparatus 1 in the remote control system where the TV apparatus 1 and the remote controller 2 are configured as described above will be described in detail below.

(1) Basic Operation

The operations of the UV apparatus 1 when power is turned on will first be described with reference to a flow chart shown in FIG. 9. If the CPU 111 first finds that a wireless communication signal from the remote controller 2 or a manipulation on the manipulation portion 117 shows that the power is requested to be turned on ("Yes" in STEP 901), electric power is supplied to the blocks of the TV apparatus 1 from an unillustrated power supply, and thus the power is turned on (STEP 902). In the TV apparatus 1, when main power is on, electric power is assumed to be supplied to part of the CPU 111, the wireless communication module 115 and the like Here, for example, in STEP 6 in the basic operation of the remote controller 2 according to the flow chart of FIG. 2, when a wireless communication signal transmitted from the wireless communication module 202 is received by the wireless communication module 115, the CPU 111 finds the manipulation request data of the wireless communication signal. Then, the CPU 111 finds that the manipulation request data shows that the power to the TV apparatus 1 is requested to be turned on, and thus the power to the TV apparatus 1 is turned on. Alternatively, the CPU 111 finds that a manipulation is performed on the manipulation portion 117 and thus the power is requested to be turned on, and accordingly the power to the TV apparatus 1 is turned on.

Thereafter, status data indicating that the power has been turned on is generated by the CPU 111, is encoded and modulated by the wireless communication module 115 and is then transmitted in the form of a wireless communication signal to the remote controller 2 (STEP 903). If the power is turned on through the manipulation portion 117, it is unnecessary to transmit to the remote controller 2 a wireless communication signal of the status data indicating that the power has been turned on.

If it is found that the power is not requested to be turned on ("No" in STEP 901) or the wireless communication signal is transmitted in STEP 903, whether or not the wireless communication module 115 receives a wireless communication signal requesting the sound source data is checked by the CPU 111 (STEP 904). If the CPU 111 finds that the wireless communication signal of the manipulation request data requesting the sound source data is received ("Yes" in STEP 904), the sound source data requested by the manipulation request data is read from the audio data memory 114 and is transmitted in the form of a wireless communication signal from the wireless communication module 115 to the remote controller 2 (STEP 905).

Specifically, for example, if, in STEP 10 in the flow chart of FIG. 2, the remote controller 2 requests that the sound source data for the voice "move the pointer" be transmitted, and then the CPU 111 finds this manipulation request data, the sound source data for the voice "move the pointer" is read from the audio data memory 114. Then, this sound source data is encoded and demodulated by the wireless communication module 115, is thereby converted into a wireless communication signal and is transmitted to the remote controller 2.

If the request of the sound source data is not found ("No" in STEP 904) or if the wireless communication signal is transmitted in STEP 905, whether or not a wireless communication signal of audio data for recording has been received by the wireless communication module 115 is checked by the CPU 111 (STEP 906). If it is found that the wireless communication signal of the audio data for recording has been received ("Yes" in STEP 906), the audio data obtained from the wireless communication signal received by the wireless communication module 115 is memorized in the audio data memory 114 (STEP 907).

Figure 7:
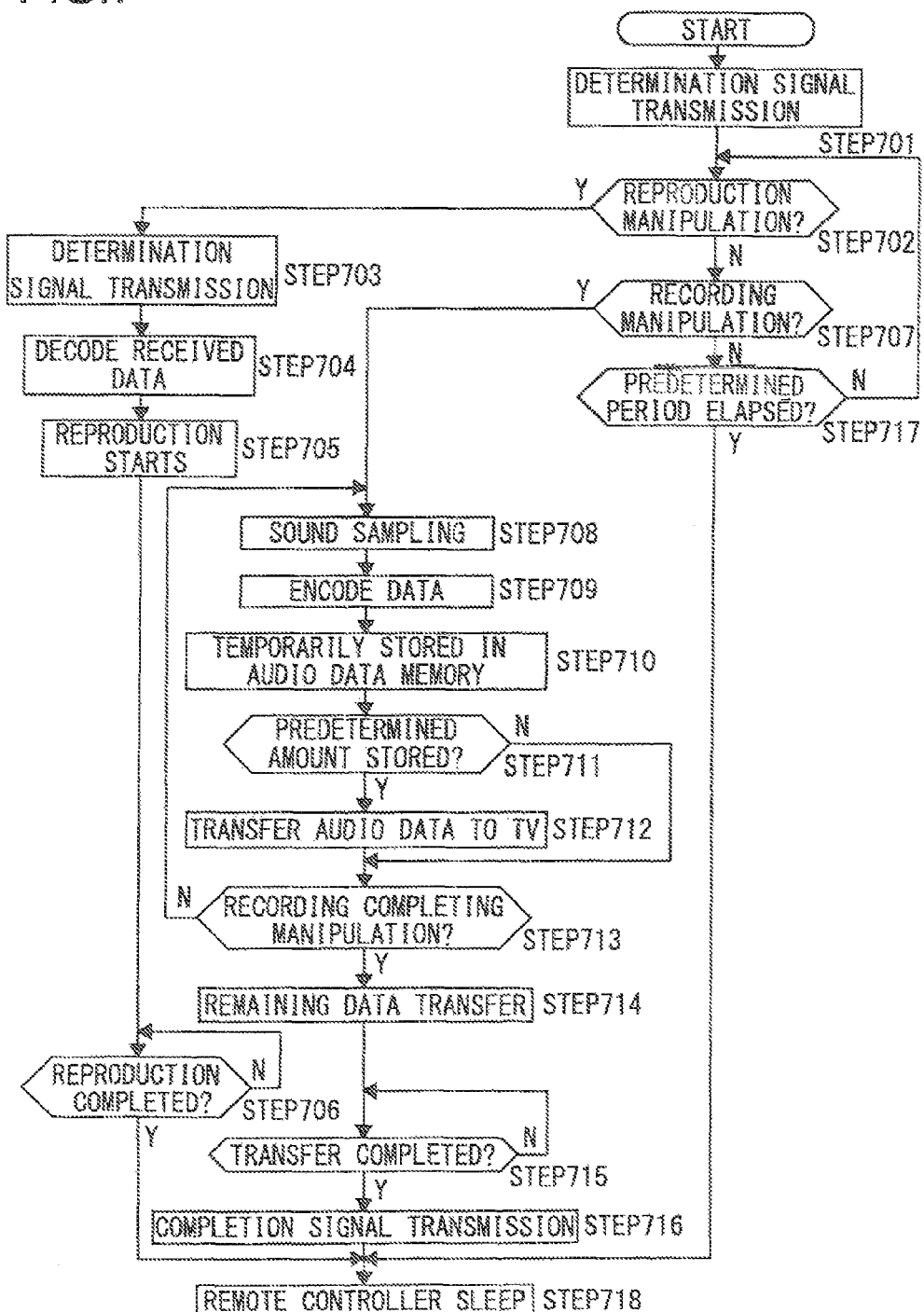
[FIG. 7] is a flow chart showing the recorder processing operation in the flow chart of FIG. 4.

Specifically, if, in STEPS 708 through 715 in the flow chart of FIG. 7, the remote controller 2 transfers the audio data for recording that is inputted through the microphone 211, the CPU 111 finds the transferred audio data for recording. Then, the received wireless communication signal is demodulated and thereafter the audio data for recording obtained by the decoding is memorized in the audio data memory 114.

When the audio data for recording is recorded in this way, the audio data memorized in the audio data memory 114 and recorded by the recorder function of the remote controller 2 may be organized on a file-by-file basis such that a file is produced every day when recording is performed. When the storage capacity of the audio data memory 114 is so small that the audio data obtained from the received wireless communication signal cannot be memorized, a wireless communication signal carrying warning information may be transmitted to the remote controller 2.

If it is found that the audio data for recording has not been received ("No" in STEP 906) or if the audio data is memorized in the audio data memory 114 in STEP 907, whether or not a wireless communication signal of manipulation request data indicating that the muting function is requested to be performed has been received by the wireless communication module 115 is checked by the CPU 111 (STEP 908). If it is found that the muting function is requested to be performed ("Yes" in STEP 908), audio is prevented, by preventing an audio signal from the decoder 103 from being fed to the amplifier 109 or by setting the amplification factor of the amplifier 109 at zero, from being outputted from the speaker 110 (STEP 909).

Figure 5:
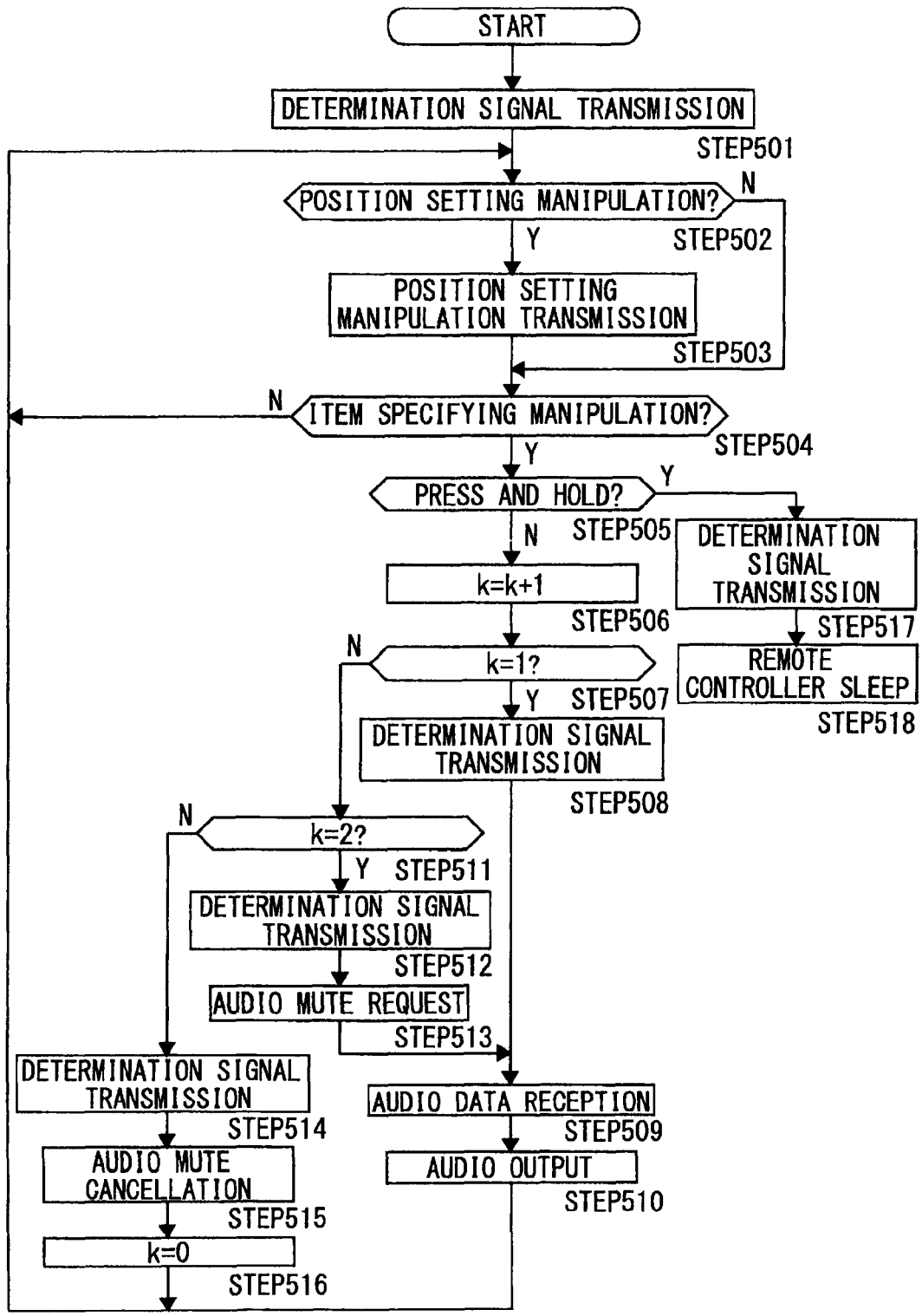
[FIG. 5] is a flow chart showing the sub screen display processing operation in the flow chart of FIG. 4.
Figure 6:
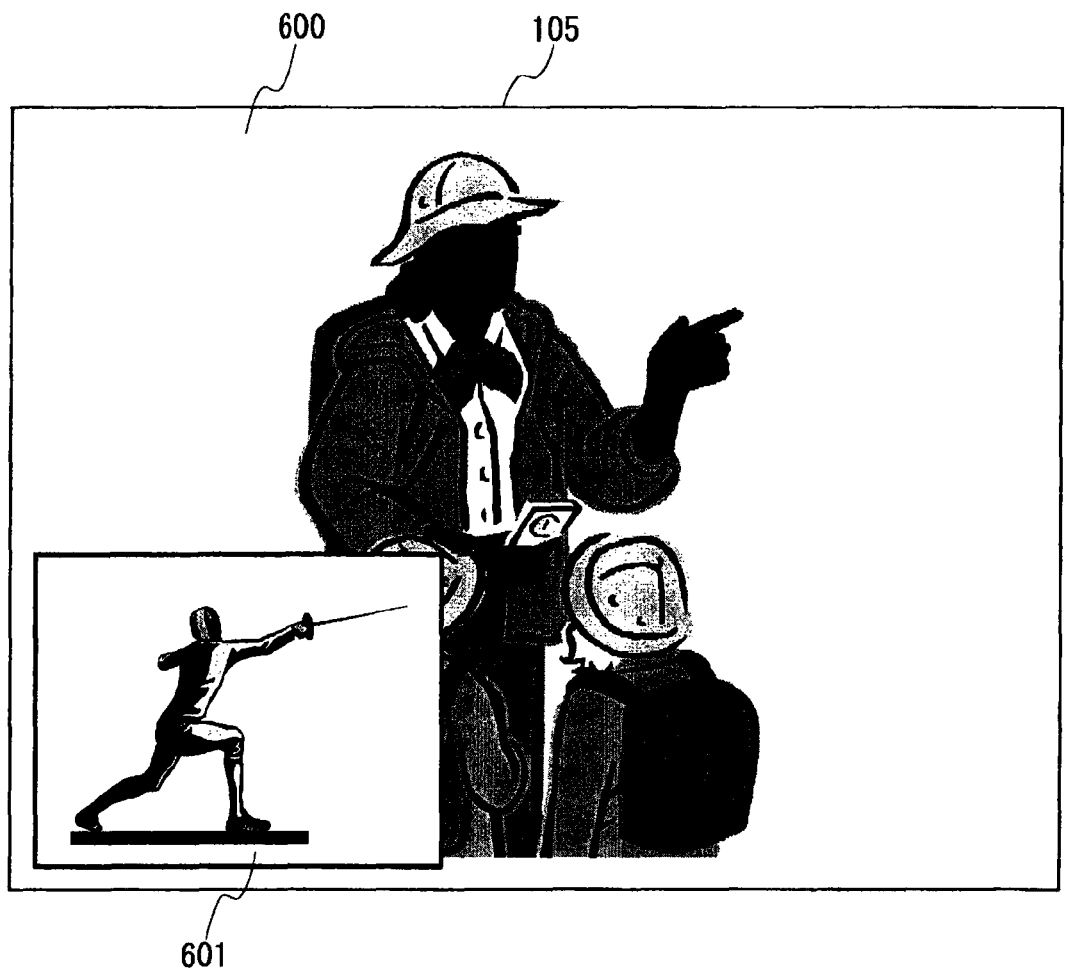
[FIG. 6] is a diagram showing an example of display in the sub screen on the display of the TV apparatus in the remote control system of FIG. 1.

Specifically, for example, if, in STEP 513 in the flow chart of FIG. 5, the remote controller 2 requests that the audio be prevented from being outputted from the speaker 110, it is found that the manipulation request data obtained from the wireless communication signal received by the wireless communication module 115 shows that the muting function is requested to be performed. Then, audio is prevented, by preventing the audio signal from the decoder 103 from being fed to the amplifier 109 or by setting the amplification factor of the amplifier 109 at zero, from being reproduced and outputted from the speaker 110. The muting function may be performed by a manipulation on the manipulation portion 117.

If it is found that the muting function is not requested to be performed ("No" in STEP 908) or if the muting function is performed in STEP 909, whether or not a wireless communication signal of manipulation request data requesting the transmission of audio data that is reproduced by the speaker 210 in the remote controller 2 has been received by the wireless communication module 115 is checked by the CPU 111 (STEP 910). If the CPU 111 finds that the audio data of the audio signal obtained by the decoder 103 is requested to be transmitted ("Yes" in STEP 910), the audio signal from the decoder 103 is encoded by the audio encoder 113 and is temporarily memorized in the audio data memory 114 (STEP 911).

Thereafter, the audio data memorized in the audio data memory 114 in STEP 911 is read, and is transmitted in the form of a wireless communication signal to the remote controller 2 by the wireless communication module 115 (STEP 912). Here, a video signal corresponding to the audio signal encoded in STEP 911 is temporarily memorized, from the decoder 103, in the frame memory 107, and is reproduced and displayed on the display 105 in synchronization with the timing with which audio is outputted by the remote controller 2 (STEP 913). The operation performed in STEP 913 is referred to as an "image synchronization delay processing operation", which will be described later.

Specifically, for example, if, in STEP 508 in the flow chart of FIG. 5, the remote controller 2 requests that audio corresponding to the video of the sub screen 601 be transmitted, the audio data of an audio signal corresponding to the video of the sub screen 601 reproduced and displayed on the display 105 is generated from the manipulation request data obtained from the wireless communication signal received by the wireless communication module 115, and is transmitted to the remote controller 2. The timing with which the video signal is reproduced and outputted on the sub screen 601 is delayed by the use of the frame memory 107 such that a video scene reproduced and outputted on the sub screen 601 is synchronized with the output of the audio from the remote controller 2.

If it is found that the audio data to be reproduced by the speaker 210 in the remote controller 2 is not requested to be transmitted ("No" in STEP 910) or if the image synchronization delay processing operation is performed in STEP 913, whether or not a wireless communication signal of manipulation request data indicating that the muting function is requested to be cancelled has been received by the wireless communication module 115 is checked by the CPU 111 (STEP 914). If it is found that the muting function is requested to be cancelled ("Yes" in STEP 914), the speaker 110 is brought to a state where audio can be outputted, by permitting the decoder 103 to feed an audio signal to the amplifier 109 or by returning the amplification factor of the amplifier 109 to the original value.

Specifically, for example, if, in STEP 515 in the flow chart of FIG. 5, the remote controller 2 requests that the output of audio from the speaker 110 be restarted, it is found that manipulation request data obtained from a wireless communication signal received by the wireless communication module 115 shows that the muting function is requested to be cancelled. Then, by permitting the decoder 103 to feed an audio signal to the amplifier 109 or by returning the amplification factor of the amplifier 109 to that before the muting function is performed, audio is prevented from being reproduced and outputted from the speaker 110. The cancellation of the muting function may also be performed by a manipulation on the manipulation portion 117.

If it is found that the muting function is not requested to be cancelled ("No" in STEP 914) or if the muting function is cancelled in STEP 915, whether or not the search for the remote controller 2 (hereinafter referred to as "a missing remote controller search manipulation") has been requested by a manipulation on the manipulation portion 117 is checked by the CPU 111 (STEP 916). If the missing remote controller search manipulation is requested through the manipulation portion 117, sound source data used when the remote controller 2 outputs sound to notify the user of the place where it is located is read from the audio data memory 114 and is transmitted in the form of a wireless communication signal from the wireless communication module 115 (STEP 917). The operation of the remote controller 2 when this missing remote controller search manipulation is performed will be described later.

Then, it is found that the missing remote controller search manipulation is requested ("No" in STEP 916) or if the wireless communication signal of the sound source data is transmitted in STEP 917, whether or not the power to the TV apparatus 1 has been requested to be turned off through the remote controller 2 or the manipulation portion 117 is checked by the CPU 111 (STEP 918). If the power is not requested to be turned off ("No" in STEP 918), the process proceeds to STEP 901, where the operations in STEP 901 and the following steps are repeated. If the power is requested to be turned off ("Yes" in STEP 918), the power is only supplied to blocks that detect whether or not the power is requested to be turned on, and the supply of the power to the other blocks in the TV apparatus 1 is stopped (STEP 919).

Figure 9:
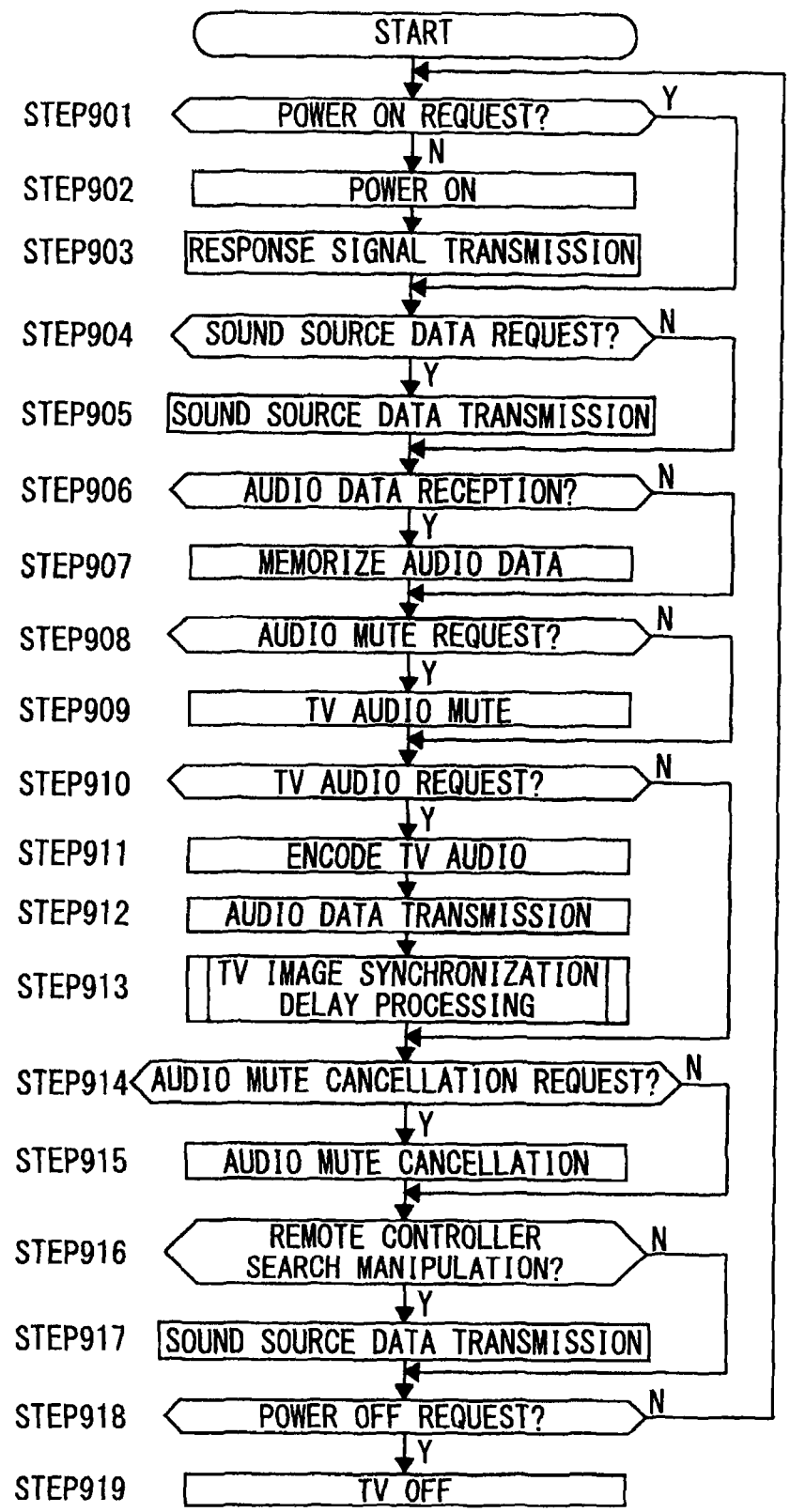
[FIG. 9] is a flow chart showing the basic operation of the TV apparatus in the remote control system of FIG. 1.

The following steps are not shown in the flow chart of FIG. 9. If in the remote controller 2, an item specifying manipulation is performed on the manipulation portion 201 in STEP 3 in the flow chart of FIG. 2, and the wireless communication signal is transmitted in STEP 4, the TV apparatus 1 receiving this wireless communication signal may transmit to the remote controller 2, if the power to the TV apparatus 1 is on as in STEP 902 and the following steps, a wireless communication signal serving as the same response signal as in STEP 903. If the manipulation portion 117 or the remote controller 2 requests that an OSD image be displayed on the display 105 of GUI, the requested OSD image is read from the image memorizing portion 106 and is reproduced and displayed on the display 105.

Figure 10:
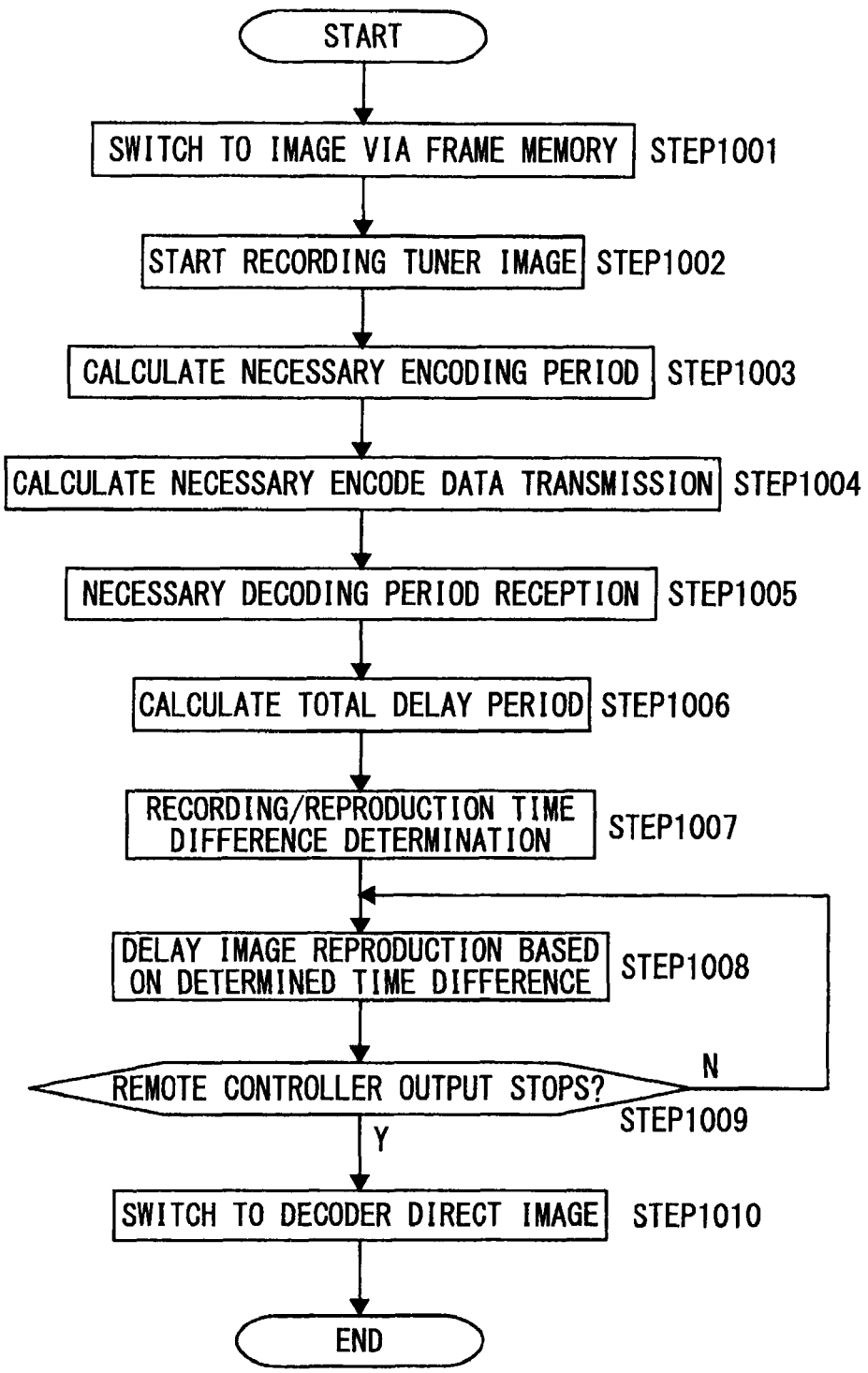
[FIG. 10] is a flow chart showing the television image synchronization delay processing operation in the flow chart of FIG. 9.

If the missing remote controller search manipulation is requested and the wireless communication signal of the sound source data is transmitted in STEP 917, this wireless communication signal of the sound source data is transmitted repeatedly until a response signal indicating the wireless communication signal is received by the remote controller 2 is transmitted in the form of a wireless communication signal from the remote controller 2 and then it is received by the wireless communication module 115. This allows the remote controller 2 being located by the missing remote controller search manipulation to reliably receive the wireless communication signal transmitted by the TV apparatus 1 to be used in the missing remote controller search manipulation (2) Television Image Synchronization Delay Processing Operation The image synchronization delay processing operation in STEP 913 in the basic operation according to the flow chart of FIG. 9 will now be described with reference to a flow chart shown in FIG. 10. As described previously, when the audio data encoded by the audio encoder 113 is transmitted in the form of a wireless communication signal, the video based on the video signal corresponding to the audio signal that has not been encoded by the audio encoder 113 is reproduced and displayed on the display 105 such that it is so delayed as to synchronize with the audio output of the remote controller 2.

Here, the CPU 111 first switches from a state in which the video signal is fed from the decoder 103 to the display control portion 104 to a state in which the video signal is fed from the decoder 103 to the frame memory 107, where it is temporarily memorized, and is then fed to the display control portion 104 (STEP 1001). Thus, the video signal outputted from the decoder 103 is fed to the frame memory 107, and a temporal recording operation is started (STEP 1002).

Then, the CPU 111 first calculates a period Ta necessary to perform the following: the audio signal fed from the decoder 103 is encoded by the audio encoder 113, is then temporarily memorized in the audio data memory 114, is then read by the wireless communication module 115 and is converted into a wireless communication signal (STEP 1003). The CPU 111 then predicts a period Tb necessary to transmit the wireless communication signal generated by the wireless communication module 115 to the remote controller 2 (STEP 1004).

With respect to the period Tb calculated in STEP 1004, for example, when the wireless communication signal transmitted from the remote controller 2 is received by the wireless communication module 115, from a time ta when the wireless communication signal is received and a time stamp given by the remote controller 2 to the wireless communication signal and the like, a time tb when the wireless communication signal is transmitted from the remote controller 2 is determined and is memorized in the memory 112. Then, when the calculation is performed in STEP 1004, the CPU 111 reads the times ta and tb recorded in the memory 112 and performs a subtraction on them, and thereby predicts the period Tb necessary for the transmission to the remote controller 2.

Moreover, the result obtained by calculating a period Tc from when the wireless communication signal is received by the wireless communication module 202 and is then decoded by the audio decoder 207 through the audio data memory 214 to when audio is reproduced and outputted by the speaker 210 is obtained by reception of the wireless communication signal transmitted from the remote controller 2 (STEP 1005). This period Tc is calculated by the CPU 204 in the remote controller 2, and the resulting data, namely, the calculation result is transmitted, from the wireless communication module 202, in the form of the wireless communication signal transmitted from the remote controller 2. Thus, in the TV apparatus 1, such a signal is received by the wireless communication module 115 and is fed to the CPU 111, where the period Tc is found.

The periods Ta to Tc required for the types of processing are calculated in this way, and then the CPU 111 sums these periods Ta to Tc to determine a delay period Td (=Ta+Tb+Tc) from when the audio signal is obtained by the decoder 103 to when it is outputted in the form of audio (STEP 1006). Then, the CPU 111 determines, from this delay period Td, a time difference between when the video signal obtained by the decoder 103 is stored in the frame memory 107 and when it is read by the display control portion 104 and is reproduced and outputted on the display 105 (STEP 1007).

The video signal recorded in the frame memory 107 from the decoder 103 is so read by the display control portion 104 as to be delayed by the time difference determined in STEP 1007, and thus a video scene synchronized with the audio reproduced and outputted by the remote controller 2 is reproduced and displayed on the display 105 (STEP 1008). When, as described above, the video corresponding to the audio reproduced and outputted by the speaker 210 in the remote controller 2 is so reproduced and outputted on the display 105 as to be delayed more than when it is decoded by the decoder 103, whether or not the transmission of the audio signal from decoder 103 is requested to be stopped by the remote controller 2 is checked (STEP 1009).

Specifically, for example, if, in the remote controller 2, the transmission of the audio data is requested to be stopped in STEP 514 in the flow chart of FIG. 5, whether or not the wireless communication signal requesting the stop of the transmission of the audio data is received by the wireless communication module 115 is checked in STEP 1009. Here, if the transmission of the audio signal from decoder 103 is not requested to be stopped ("No" in STEP 1009), the process proceeds to STEP 1008, where the video displayed on the display 105 is delayed based on the calculated delay period.

Then, if it is found that the transmission of the audio signal from decoder 103 is requested to be stopped ("Yes" in STEP 1009), the feed of the video signal to the display control portion 104 through the frame memory 107 is stopped, and the video signal is fed to the display control portion 104 directly from the decoder 103 (STEP 1010). When a feed path from the display control portion 104 to the decoder 103 is switched, it is alternatively possible to delay the audio signal from the decoder 103 by the use of the audio data memory 114 or the like and then vary the times when the audio and video signals are read to gradually eliminate the delays of the audio and video signals. Here, when the delays are eliminated, the audio and video signals from the decoder 103 are directly fed to the DAC 108 and the display control portion 104, respectively.

(Processing Operations on the Remote Controller for the Missing Remote Controller Search Manipulation)

Figure 11:
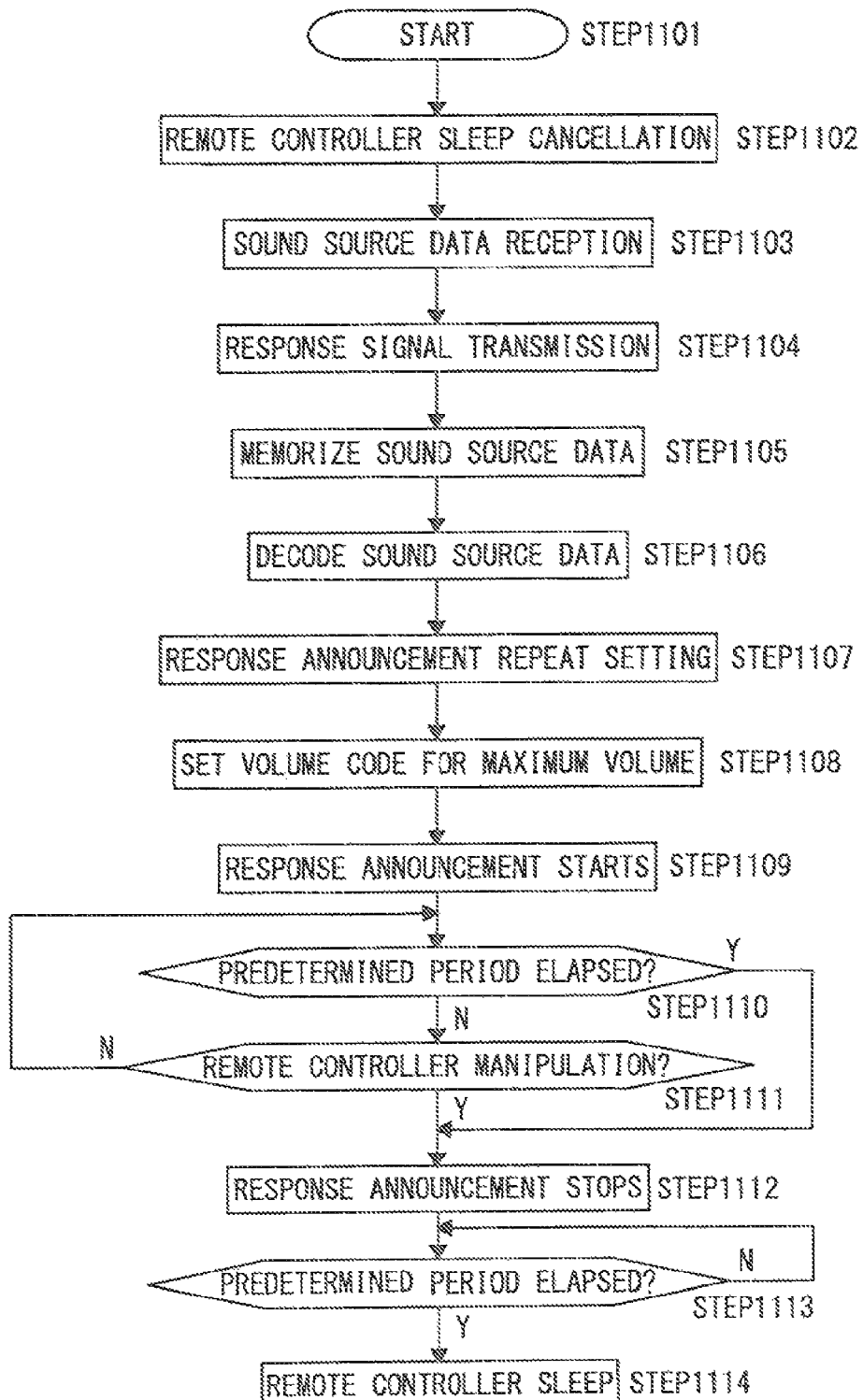
[FIG. 11] is a flow chart showing the missing remote controller search manipulation in the remote control system in FIG. 1.

The operations on the remote controller 2 for the missing remote controller search manipulation in the remote control system composed of the TV apparatus 1 and the remote controller 2 as described above will be described in detail below with reference to a flow chart of FIG. 11. Specifically, the operations on the remote controller 2 when the missing remote controller search manipulation is requested by a manipulation on the manipulation portion 117 in the TV apparatus 1 will be described below.

When, as described above, in the TV apparatus 1, the operation in STEP 917 in the flow chart of FIG. 9 is performed and the wireless communication signal of the sound source data used for the missing remote controller search manipulation is transmitted, this wireless communication signal is received by the wireless communication model 202 in the remote controller 2. When the watchdog 203 finds that the wireless communication signal from the TV apparatus 1 has been received (STEP 1101), a signal is fed to the CPU 204 from the watchdog 203, and thus the sleep state of the remote controller 2 is exited (STEP 1102). Specifically, the power supply portion 206 is so controlled by the CPU 204 as to supply power required for the speaker 210 to output audio, with the result that the sleep state is changed to the start-up state.

In the remote controller 2, which has changed its state to the start-up state, the wireless communication module 202 performs a reception operation to receive the wireless communication signal from the TV apparatus 1 and acquires, from the received wireless communication signal, the sound source data for the missing remote controller search manipulation (STEP 1103). When the wireless communication signal from the TV apparatus 1 is successfully received in STEP 1103 in this way, the CPU 204 generates a response signal for notifying the TV apparatus 1 of the fact that it has been successfully received, and the response signal in the form of a wireless communication signal is transmitted from the wireless communication module 202 to the TV apparatus 1 (STEP 1104).

Thereafter, when the sound source data obtained in STEP 1103 is fed to and memorized in the audio data memory 214 (STEP 1105), the sound source data memorized in the audio data memory 214 is read by the audio decoder 207 and is encoded by an encoding method such as an ADPCM method (STEP 1106). In order for an audio announcement corresponding to the sound source data for the missing remote controller search manipulation to be reproduced and outputted repeatedly until the user finds the remote controller 2 and manipulates it, a setting is made such that such reproduction is repeatedly performed (STEP 1107).

Figure 8:
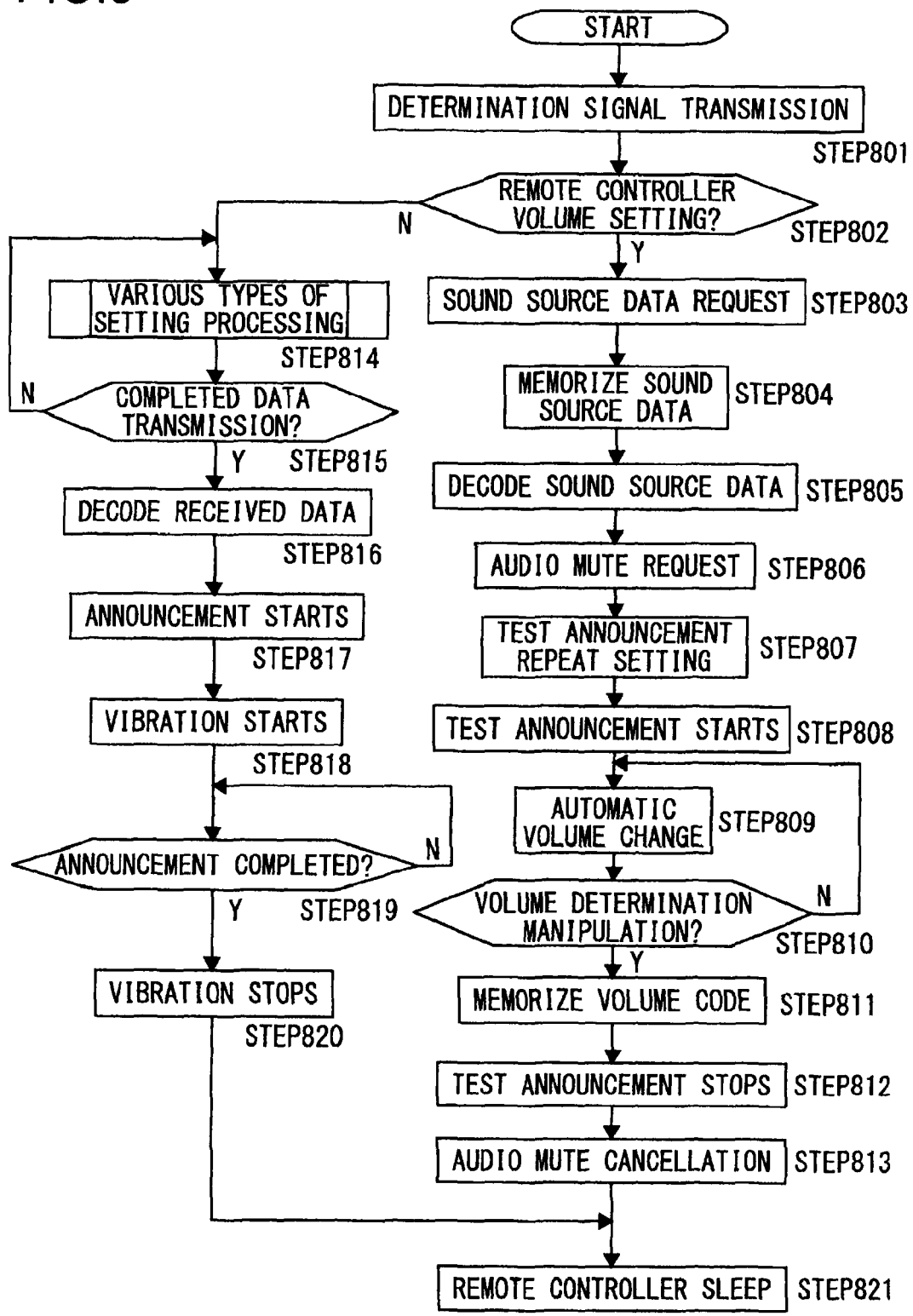
[FIG. 8] is a flow chart showing the setting processing operation in the flow chart of FIG. 4.

Specifically, in STEP 1107, as in STEP 807 in the flow chart of FIG. 8, an audio signal obtained by decoding the sound source data for the missing remote controller search manipulation is temporarily held in the audio decoder 207, and thus the setting is made such that such reproduction is repeatedly performed. In order for the audio announcement to be reproduced and outputted repeatedly, it is alternatively possible to read, from the audio data memory 214, the sound source data for the missing remote controller search manipulation and decode it every time the audio decoder 207 completes outputting the audio announcement.

Moreover, by, for example, reading, from the memory 205, an audio code to maximize the volume and then maximizing the amplification factor of the amplifier 209 with the CPU 204, the volume of audio reproduced and outputted from the speaker 210 is so set as to be maximized (STEP 1108). When, as described above, such settings for repeatedly outputting the audio announcement corresponding to the sound source data for the missing remote controller search manipulation and for maximizing the volume are made, the audio signal decoded by the audio decoder 207 is converted into an analog signal by the DAC 208 and the audio announcement corresponding to the sound source data for the missing remote controller search manipulation is reproduced and outputted from the speaker 210 (STEP 1109).

If the reproduction and output of the audio announcement is started, the CPU 204 checks whether or not a predetermined period T8 has elapsed since the start of the reproduction and output of the audio announcement (STEP 1110). If the predetermined period T8 has not elapsed ("No" in STEP 1110), the CPU 204 checks whether or not the manipulation portion 201 has been manipulated (STEP 1111). If it is found that the manipulation portion 201 has not been manipulated ("No" in STEP 1111), the process proceeds to STEP 1110, where whether or not the predetermined period T8 has elapsed is checked. In this way, the CPU 204 checks whether or not the predetermined period T8 has elapsed since the start of the audio announcement and whether or not the manipulation portion 201 in the remote controller 2 has been manipulated.

Then, if it is found that the predetermined period T8 has elapsed since the start of the announcement ("Yes" in STEP 1110) or that the manipulation portion 201 has been manipulated ("Yes" in STEP 1111), the audio signal temporarily stored in the audio decoder 207 is deleted and the sound source data memorized in the audio data memory 214 and used for the missing remote controller search manipulation is also deleted, with the result that the reproduction and output of the audio announcement from the speaker 210 is stopped (STEP 1112).

If the reproduction and output of the audio announcement is stopped, the CPU 204 checks whether or not a predetermined period T9 has elapsed since the stop of the audio announcement (STEP 1113). If it is found that the predetermined period T9 has elapsed since the stop of the audio announcement ("Yes" in STEP 1113), as in STEP 25 in the flow chart of FIG. 2, the remote controller 2 is changed to the sleep state (STEP 1114).

If the volume is set at the maximum volume in STEP 1108, the original volume code may be memorized in the memory 205. In this way, when the reproduction and output of the audio announcement corresponding to the sound source data for the missing remote controller search manipulation is stopped in STEP 1112, it is possible to return, by setting the amplification factor of the amplifier 209 or the like according to the original audio code memorized in the memory 205, the volume from the speaker 210 to the original volume. When the manipulation portion 117 in the TV apparatus 1 is manipulated and thus the missing remote controller search manipulation is requested to be stopped, the reproduction and output of the audio announcement in the remote controller 2 may be stopped.

Industrial Applicability

The present invention can be applied not only to the above-described remote control system for the TV apparatus but also to a remote control system for an electronic device incorporating a display that allows GUI display.

The invention claimed is:

1. A remote control system comprising:
a television set arranged to receive a television manipulation signal to transmit encoded sound source data for explaining how to manipulate the television set in response to the receipt of the manipulation signal; and
a remote controller arranged to transmit the manipulation signal to the television set and arranged to decode the sound source data received from the television set and to provide as output the decoded sound source data explaining how to manipulate the remote controller for controlling the television set in a form of audio at the remote controller.

2. The remote control system of claim 1 wherein the encoded sound source data transmitted from the television set to the remote controller relates to a manipulation for the remote controller to perform subsequent to the former manipulation which caused the television manipulation signal transmitted to the television set.

3. The remote control system of claim 1 arranged such that when the subsequent manipulation is not performed within a predetermined period after reception of the manipulation signal, the television set transmits to the remote controller sound source data for prompting a user to perform the subsequent manipulation at the remote controller.

4. The remote control system of claim 1 wherein the remote controller is arranged to receive sound source data on a following manipulation from the television set by transmission of the manipulation signal.

5. The remote control system of claim 1 arranged such that when any subsequent manipulation is not performed within a predetermined period after transmission of the manipulation signal, the remote controller receives, from the television set, sound source data for prompting a user to perform the subsequent manipulation.

6. The remote control system of claim 5 wherein the television set is arranged to move a display on the television screen in response to reception of the manipulation signal.

7. The remote control system of claim 1 wherein the television set is arranged to change the manipulation display on the television screen in response to reception of the manipulation signal.

8. The remote control system of claim 7 wherein the television set can display a main screen and a sub screen on the television screen, and wherein the television set is arranged to move the sub screen within the main screen in response to reception of the manipulation signal.

9. The remote control system of claim 7 wherein the television set is arranged to move a pointer indicating a manipulation position within the television screen in response to reception of the manipulation signal.

10. The remote control system of claim 1 wherein the sound source data transmitted from the television set is ADPCM-encoded, and the remote controller has an ADPCM decoder.

11. The remote control system of claim 1 wherein the remote controller has a three-dimensional force sensor for generating the manipulation signal.

12. The remote control system of claim 1 wherein the remote controller has a touch panel sensor for generating the manipulation signal.

13. The remote control system of claim 1 wherein the remote controller is arranged to receive and decode sound source data that is not based on a manipulation on the remote controller and that is transmitted from the television set and wherein the remote controller is arranged to provide as output the decoded sound source data in a form of audio.

14. The remote control system of claim 1 wherein the remote controller is arranged to receive and decode sound source data stored in the television set by transmission from the remote controller and wherein the remote controller is arranged to provide as output the decoded sound source data in a form of audio.

15. A television set in cooperation with an outside remote controller comprising:
a television screen;
a transmit/receive portion;
an inside controller arranged to control the television set based on a display on the television screen and a manipulation signal received by the transmit/receive portion from the remote controller;
a sound source data storing portion arranged to store encoded sound source data for explaining how to manipulate the television set; and
a transmission control portion arranged to select, from the sound source data storing portion, the sound source data and to transmit the selected sound source data through the transmit/receive portion to the remote controller in response to the manipulation signal received from the remote controller.

16. The television set of claim 15 wherein the transmission control portion is arranged to transmit sound source data on a subsequent manipulation requested by the manipulation signal.

17. The television set of claim 15 wherein the sound source data storing portion stores ADPCM-encoded sound source data.

18. A remote controller for an outside television set comprising:
a manipulation portion;
a transmit/receive portion;
a transmission control portion arranged to transmit, through the transmit/receive portion, a manipulation signal to the television set based on a manipulation on the manipulation portion;
a decoder arranged to decode sound source data for explaining how to manipulate the television set, the sound source data being received from the television set in relation to the transmission of the manipulation signal; and an output portion arranged to provide as output the received sound source data decoded by the decoder in a form of audio.

19. The remote controller of claim 18 wherein the manipulation portion has a three-dimensional force sensor for generating the manipulation signal.

20. The remote controller of claim 18 wherein the manipulation portion has a touch panel sensor for generating the manipulation signal.

21. The remote controller of claim 18 wherein the decoder has an ADPCM decoder.

22. The remote controller of claim 18 further comprising:
a vibration generation portion arranged to operate when decoding is performed by the decoder to produce audio.

23. A television set comprising:
a television screen;
an inside speaker;
a control portion arranged to provide as output a television program through the television screen and the inside speaker, an image data of the television program being displayed on the television screen and an audio data of the television program being normally outputted from the inside speaker;
a wireless transmission portion arranged to transmit, to an outside speaker, sound source data obtained by encoding the audio data of the television program, no audio being output from the inside speaker when the sound source data is transmitted from the wireless transmission portion to the outside speaker; and
image delaying means for delaying, when the sound source data is transmitted from the wireless transmission portion to the outside speaker, the image data displayed on the television screen to compensate for the time taken for the outside speaker to decode the sound source data.

24. The television set of claim 23 wherein the sound source data transmitted from the television set is ADPCM-encoded.

25. The television set of claim 23 wherein the outside speaker is included in a remote controller for the television set, the remote controller having a reception portion arranged to receive the sound source data transmitted through the wireless transmission portion.

* * * * *